United States Patent
Arita et al.

(10) Patent No.: US 7,336,156 B2
(45) Date of Patent: Feb. 26, 2008

(54) COMMUNICATION APPARATUS, COMMUNICATION METHOD AND INSTALLATION METHOD OF RAILWAY VEHICLE-FACILITY INTRA COMMUNICATION SYSTEM

(75) Inventors: Setsuo Arita, Tokyo (JP); Yuji Ichinose, Tokyo (JP); Daisuke Shinma, Tokyo (JP); Naoyuki Yamada, Tokyo (JP); Hiroyuki Akiyama, Tokyo (JP); Shigenobu Yanai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 10/818,476

(22) Filed: Apr. 5, 2004

(65) Prior Publication Data

US 2004/0227036 A1  Nov. 18, 2004

(30) Foreign Application Priority Data

Apr. 8, 2003  (JP) .............................. 2003-103686

(51) Int. Cl.
*G05B 11/01* (2006.01)
*B60L 9/00* (2006.01)
*A63G 25/00* (2006.01)
(52) U.S. Cl. ..................... 340/310.11; 340/310.12; 340/310.16; 191/10; 180/2.1
(58) Field of Classification Search .......... 340/310.11, 340/310.12, 310.16; 180/12.1; 191/10
See application file for complete search history.

(56) References Cited

U.S. PATENT DOCUMENTS

| 5,573,090 A | * | 11/1996 | Ross ........................... 191/10 |
| 6,229,434 B1 | * | 5/2001 | Knapp et al. .......... 340/310.16 |
| 2004/0176880 A1 | * | 9/2004 | Obradovich et al. ........... 701/1 |

FOREIGN PATENT DOCUMENTS

| DE | WO 98/47127 | * | 10/1998 |
| EP | 1 168 691 | | 1/2002 |
| JP | 05-083172 | | 4/1993 |
| JP | 11-317697 | | 11/1999 |
| JP | 2001-094526 | | 4/2001 |
| JP | 2001-111518 | | 4/2001 |
| JP | 2002-215914 | | 8/2002 |
| JP | 2002-319919 | | 10/2002 |
| JP | 2002-344417 | | 11/2002 |
| JP | 02004222176 A | * | 8/2004 |
| WO | 01/84737 | | 11/2001 |

* cited by examiner

*Primary Examiner*—Julie Lieu
(74) *Attorney, Agent, or Firm*—Hogan & Hartson LLP

(57) ABSTRACT

A communication apparatus installed in the trains and that in a complex station building, a station or a maintenance factory communication through feeders, trolley wires or third rails can communicate each other. The present invention can realize a low cost vehicle-facility intra communication system that provides various information services available in the train.

67 Claims, 21 Drawing Sheets

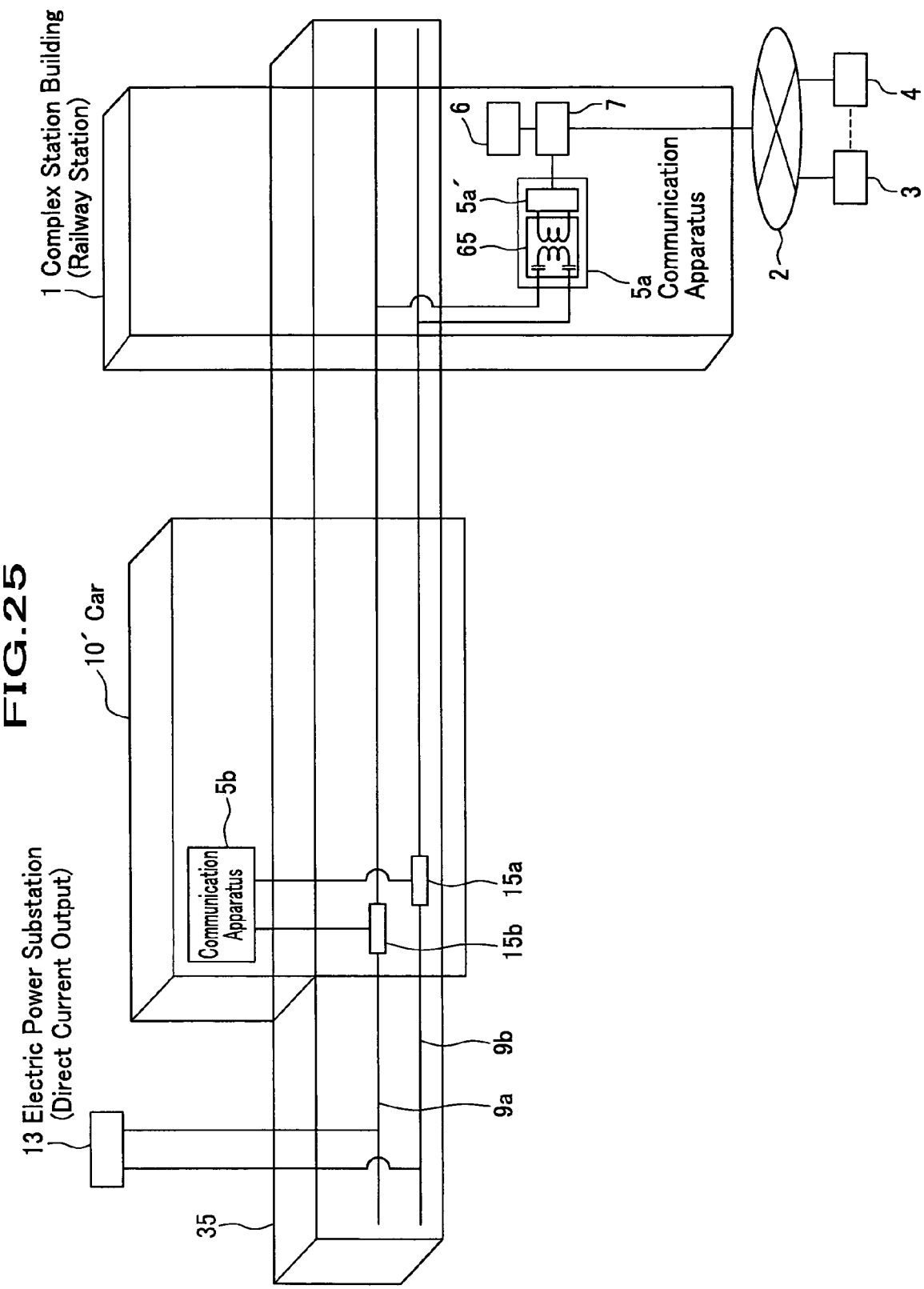

COMMUNICATION APPARATUS, COMMUNICATION METHOD AND INSTALLATION METHOD OF RAILWAY VEHICLE-FACILITY INTRA COMMUNICATION SYSTEM

FIELD OF THE INVENTION

The present invention relates to an intra communication system to communicate necessary information between the railway vehicles and the railway facilities, especially, the communication apparatus, the communication method and the installation method.

BACKGROUND OF THE INVENTION

One of the recent services in the railway transportation services is a passenger information service available in the vehicles. For this purpose, a new communication cable is set along the railway and display panels are installed on the upper site of the car doors. In most cases, the information is provided by playback operation of the data that is retrieved from storage devices installed in the cars, but it is not on-line or real-time information. A recent demand for the technology is to provide the up to date information through a communication system that makes a linkage between the railway vehicles and the railway service facilities (we call this communication system as "a railway vehicle-facility intra communication system" or an intra communication system for an abbreviation). There are a couple of conventional technologies for such demand as shown in the reference 1 and 2. The technology described in the reference 1 describes a communication technology using a power line carrier with modulator and demodulator devices installed in the cars and railway power stations where the communication is done through the trolley wires. The technology in the reference 2 describes a communication services by which a passenger can place commercial orders during when he is traveling by the train.

Reference 1:
Published Japanese Patent Application: Paragraph 0005 -0015, JP, H11-317697, A (1999)
Reference 2:
Published Japanese Patent Application: Paragraph 0005- 0012 JP, 2002-215914, A (2002)

BRIEF SUMMARY OF INVENTION

The conventional technology shown in the reference 1 proposes the power line carrier communication using the trolley wire with the modulator/demodulator devices installed in the railway power substations and the railway vehicles. But no considerations are paid for these conventional technologies regarding the electric noises carried in the power line. The recent electric cars have various kinds of inverters to drive the power motors and to control devices that serve good accessibility of the vehicles and comfortableness for the passengers. The switching devices for these inverters, such as IGBTs (Insulating Gate Bipolar Transistor), bipolar transistors, FET (Field Effect Transistor) and thyristors, generate substantially the electromagnetic noise. The electromagnetic noise (we call EM noise, hereinafter) is generated by the inductance and the capacitance of the circuit and in the transient turn-on or turn-off switching of the switching devices. The frequency of the noises provided for the vehicle applications has been measured and it has been known that the frequency is from several hundred KHz to several tens MHz and sometimes to several hundred MHz in the high frequency range. The frequency of the electric power used for the driving motors is variable for the speed control and the EM noise less than several tens KHz is generated as well. The power distribution against the frequency is that the low frequency noise has more power than the high frequency noises. The frequency of EM noises in the inverter devices is mainly in less that several MHz. These noises are fed back to and superimposed in the power line. The discharge between the trolley wires and the pantograph generates EM noises in rather higher frequency as several MHz to several hundred MHz superimposed in the trolley wire. It has been found that these noises intrude in and disturb the power line carrier communication executed between the modulator devices and the demodulator ones attached to the railway cars and railway power substations. The trolley wire works as an antenna to receive radio waves used for the ham stations and TV and radio broadcast stations and repeater stations. These waves work as noises in the trolley wires and disturb the power line carrier communication as well.

Another technology for the intra communication system is a radio communication. But this needs many antennas set along the railway to keep a reliable communication insensitive to the weather conditions, proximity of buildings, railway surrounding environments as in tunnels, in railway stations or in banks. Therefore it is a problem that the construction cost for the radio communication system is potentially high.

The conventional technology described in the reference 1 has an applicability to be connected to the external network so that the e-mail and an internet communication are possible. However the priority of the communication contents are in maintenance information necessary for the services in maintenance or inspection, the operation service management information, advertisement information and TV programs for which the communication with the information center locating in the station or the complex building in the station, the train maintenance factories or the machine shops are mainly required. For the advertisement information and TV programs, it is necessary to update or collect the particular information that is to be compliant to the local areas which the train passes by or through. Therefore the large capacity communication is required in the location where the train passes by the complex buildings in the stations.

The present invention has advantages for such a requirement necessary for the intra communication system that enables low cost system construction and reliable and stable communication for which the present invention provides a new system apparatus, a new communication method and a new system installation method.

The railway vehicles regarding the present invention includes electric cars, monorail cars, trolley cars, rubber tire cars.

BRIEF DESCRIPTION OF THE DRAWINGS

FIG. 25 shows an explanatory schematic for the third embodiment of the present invention.

DETAILED DISCRIPTION OF THE INVENTION

Figure 1:
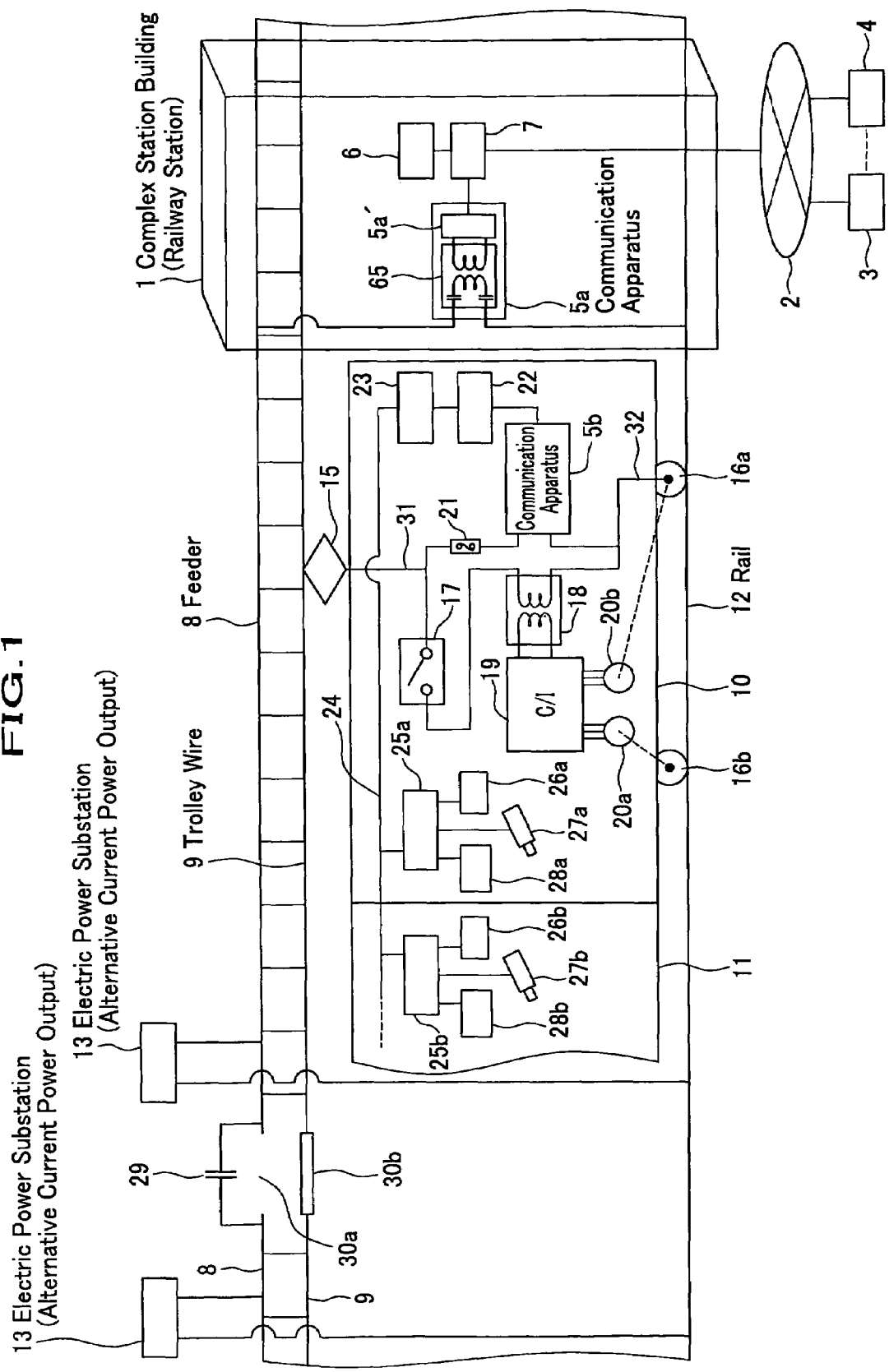
FIG. 1 is a schematic that shows the first embodiment of the present invention.

The fundamental hard ware elements comprises of an intra communication system where a set of an intra communication apparatus (that is communication apparatus to carry out the communication between the railway vehicles and the railway facilities through a power line carrier) is used at least one for the car and a railway facility. The intra communication apparatus installed to the car is linked between the pantograph or electric collector and the rails. The other intra communication apparatus is installed in the railway facilities where a linkage is made between the railway and a feeder, a trolley wire or a third rail. The communication is performed between these two intra communication apparatuses. For the carrier waves, plural frequencies are used (called a multiple carrier). The data are divided into pieces of information and assigned all of the carriers, so that spread spectrum communication methods and frequency hopping methods are performed. The intra communication apparatuses installed in the railway facilities can handle graphic data and send the contents to be displayed on displays put over the car doors and the service displays for the passenger, or on the operation displays for the train drivers and the maintenance service information for car maintenance and inspection.

The spread spectrum communication method and the frequency hopping method uses the flexibility of the time sharing and the carrier frequency against the EM noises carried on the trolley wire which are rather confined in the radio waves of ham radios, TV and radio broadcast stations or repeaters, and the inverter signals used for the car driving motors and the control devices. Therefore the intra communication system regarding the present invention has advantages of high immunity against these noises, high reliability in the communication and low cost system building due to no necessity for a new communication cable wiring along the railway and their facilities.

By using OFDM (orthogonal frequency division multiplexing) and the multiple carrier signal communication schemes, the present invention has further advantages for the robust communication against noisy environment. The communication band with for the intra communication system of the present invention is limited by the signal decay in the range of high frequency carriers and therefore the widening of the spectrum of the carrier frequency is limited by such signal decay. Therefore the signal communication schemes such as OFDM and multiple carrier which use rather narrow spectrum advantageously contribute to the high data rate communications.

When the train takes slow down of the speed near the stations or stops at the station, the electric discharging between the trolley wire and the pantographs is reduced and the inverter controlling for the car driving becomes idling. Then the high speed communication can be possible due to the reduction of noise generation. The large data capacity for a unit time can be facilitated. Even when the train is passing by the stations, the speed is slow downed and the relatively high speed communication or relatively high capacity communication is also possible.

For the large capacity communication, the better information service can be realized by the service contents such as seat reservation information, advertisement information, up to date TV programs (news, on-the-spot sports broadcasting, movies, etc.) or on-line TV programs. The train operation service information is available such as the station information for the next stop or the predicted arrival time, the security information (crimes, troubles or emergency of the passengers), on-site TV monitoring information, operation information (temperatures of the car motors, inverters, mechanical vibration, voltage and current of the driving motors and controlling devices) which can support a predictive maintenance of the train and the resultant countermeasures can be made when the operation trouble of the train is found, before the train arrives at the predicted station, enters into the district of train service, driver control and the train shed. The data of the operation information may be sent to the train maintenance factories in real-time or sent the stored acquisition data of the operation information to the maintenance factories afterwards through this intra communication system. The present invention has an advantage for this railway vehicle data services.

The First Embodiment

The FIG. 1 shows the first embodiment of the present invention for the railway vehicle-facility intra communication system. For the railway vehicle, an AC powered electric car is explained. The details of the complex building of the station are not drawn out, but the communication apparatus 5a is set in a maintenance factory and is connected to a server 7. The server is linked with a terminal device 6 as well as the communication network 2 through which advertisement center 3 and the reservation center 4 are connected thereto. The communication apparatus 5a is connected to the feeder 8 and the rail 12, both of which supply the electric power to the train. The train is formed with cars 10, 11 and etc. The car 10 receives electric power from the electric power substation 13 and 14 through a pantograph 15. The feeder supplies the electric power to the car 10 through a trolley wire 9 from the electric power substations 13 and 14. The trolley wire 9 functions as an electric power transmission and a mechanical slider with the pantograph 15. The electric power through the pantograph 15 is supplied to a transformer 18 via a protection circuit 17 and the power current returns to the electric power substation 13 through wheels 16a and rail 12. A converter/inverter (C/I) 19 is connected to the secondary of the transformer 18. The motors 20a and 20b that drive the rotation of the wheels are controlled by the converter/inverter 19. The feeder 8 and trolley wire 9 are generally called an aerial wire.

The communication apparatus 5b is connected to a power cable 31 which is connected to the pantograph 15 and another power cable 32 which is connected to wheels 16a. The fuse 21 works as a breaker to prevent a shunt between power cables 31 and 32 via the communication apparatus 5b when it is broken. Both communication apparatuses 5a and 5b can communicate through the feeder 8, trolley wire 9, wheels 16a and rail 12 as a communication channel.

A communication cable 24 is set in the car by which the communication port devices 23, 25a and 25b mutually transceive the information. The communication apparatus 5b is connected to a communication port device 23 through a communication server 22 and can communicate with other communication port devices 25a and 25b to which monitoring cameras are connected. Therefore it is possible to send the communication apparatus 5b the graphic information of the monitoring images taken by the monitoring cameras 27a and 27b through the communication server 22. The data output from the accelerometers, the thermal sensors, the voltage sensors, the current sensors and other various sensors are acquired by the data acquisition devices 28a and 28b and handed to the communication port devices 25a and 25b as maintenance data. These data are sent to the communication apparatus 5b through communication device 23 and the communication server 22.

These data such as the maintenance data and the monitoring image data is sent to a communication apparatus 5a set in a complex station building or a railway station 1. As the result, these data are displayed in a terminal device 6 and the railway operation service persons can prevent the potential crimes and check the public offensive behaviors of the passengers and judge the normal and the abnormal operation status of the cars.

It is possible to send the maintenance data to maintenance factories in real-time or on-line communication. It is also possible to read out or dump out these data in the maintenance factories or shops. For such communication, the quality of the communication is important therefore it can be done in the low speed operation since the inverter is not activated and generates little noises.

The information obtainable from an advertisement center 3 or a seat reservation center 4 through an internet 2 is received by the communication apparatus 5a and sent to the communication server 22 where the information is stored. Then it can be shown on the display devices 26a and 26b. The passenger can watch the advertisement, the public information and the TV programs. There is no particular restriction of the locations or the kinds of the display devices as far as the passenger can easily watch. When the train slows down the speed the noise in the communication wire becomes quite since the inverter is not largely activated and the data stored in the communication server 22 can be updated during a large communication capacity is obtained when the train stops at the station or comes near to the station.

The communication server 22 can provide a versatile monitoring capability so that the updated seat reservation information of other trains and the train operation service information are available in the train.

The railway interval range supported by an electric power substation is limited to several tens kilometers due to resistive power loss due to the long distance of feeder 8 and rail for current circulation. Each interval is isolated by a gap (called air section) 30a or insulator (called an insulator section) 30b. Therefore when the car is operating in the interval supported by the electric power substation 14, the communication apparatus 5b cannot communicate with the communication apparatus 5a because the trolley wires 9 are isolated from the interval that is connected to the communication apparatus 5a. In order to solve this problem, a high frequency capacitor 29 is connected in the gap 30a between two feeders. Then the information carried on the high frequency signal can pass through the feeders 8 but the electric power is isolated between the two adjacent intervals.

When the electric power substations 13 and 14 supply the direct current power, the direct signal transceiving between two communication apparatuses 5a and 5b through the trolley wire 9 is possible.

The signal coupler 65 is composed of capacitors and a transformer. The capacitors cut the AC and DC power current. The impedance of the transformer and the capacitance of the capacitors have a frequency characteristic so that the high frequency signal passes the signal coupler 65. Therefore the signal coupler 65 has a high pass filter characteristic to pass and superimposes the communication signal which is in a mega hertz frequency band without serious decay.

Since the communication apparatus needs a convenient and an accessible linkage with the networks, it is preferable to be set in the complex station building or railway station 1 which is close to the commercial network cables. On the other it is necessary that the signal coupler 65 is connected to the trolley wire 9 to which high voltage is supplied. Therefore the capacitors of the signal coupler 65 are connected to the trolley wire 9 at the location far from such building the other portion as the transformer and else of the signal coupler 65 is set in location easily accessible to the networks such as the complex station building 1. For further keeping safety, the signal coupler 65 itself may be set in outdoor as in the station or maintenance factory and the rest circuit portion 5a' (called a signal processing circuit) of the communication apparatus 5a. In the present embodiment, the installation of the communication apparatus 5a can be separately done as described above as well as all portions of the communication apparatus 5a in a single unit.

For case of double track, it is possible to independently set an identically same communication system is installed to an upper stream track and a downstream track. However no interference happens for these two tracks since the complete isolation is possible due to use of different electric power substations 13 and 14.

Figure 2:
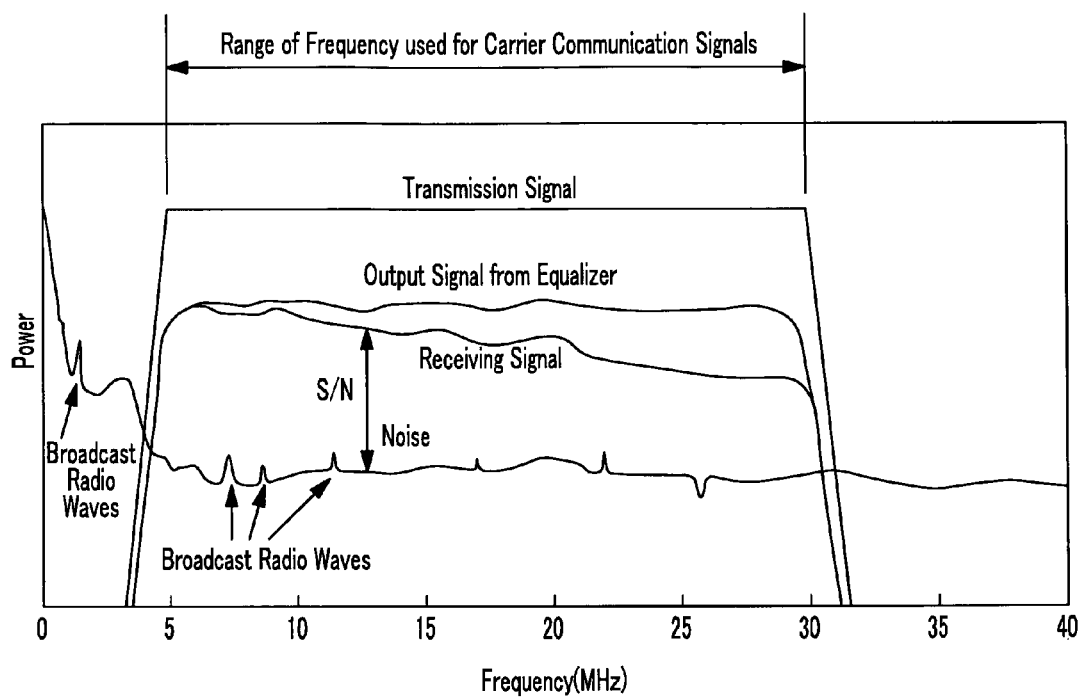
FIG. 2 is a characteristic chart that shows the communication feature of the present invention.

FIG. 2 shows an example of the frequency distribution of the noises and the carrier communication signals, both of which are superimposed each other. The noises are generated by the switching devices used in the converter/inverter (C/I) 19 and the antenna function of the trolley wire 9 receiving various radio waves. The noise has high energy spectrum below 1 MHz frequencies and low energy spectrum over 5 MHz. It is preferable to set the communication signal band in the range of 1 MHz to 30 MHz but the range from 5 MHz to 30 MHz is more preferable. For this high frequency carrier signal, the signal transmission is possible even in lacking of ohmic contact between the trolley wire 9 and the pantograph 15 such in case of lose contact in the sliding. Therefore the carrier signal transceiving is rather maintained in the train operation. However, the draw back of the high frequency is the skin effect of the conduction material such as the trolley wire 9 and the rail 12 through which the electric power current is supplied and returns. As the result of these skin effect, the traveling signal energy is confined on the surface of the conductive material therefore the effective conductivity of such conduction material is low and the carrier signal is lost largely in the transceiving. Another cause of losses is dielectric loss of the water which stays on the surface of trolley wires 9 and rails 12 and in the ground under the rails 12.

The trolley wires have branches in accordance to the railway branches. These branches provide electrically discontinued loads or the discontinued cable impedance for the signal carriers that travel in the trolley wires. Therefore the branches of the trolley wires generate the reflections in the carrier communication which result in a decay of the true signals and generation of spurious signals.

Figure 3:
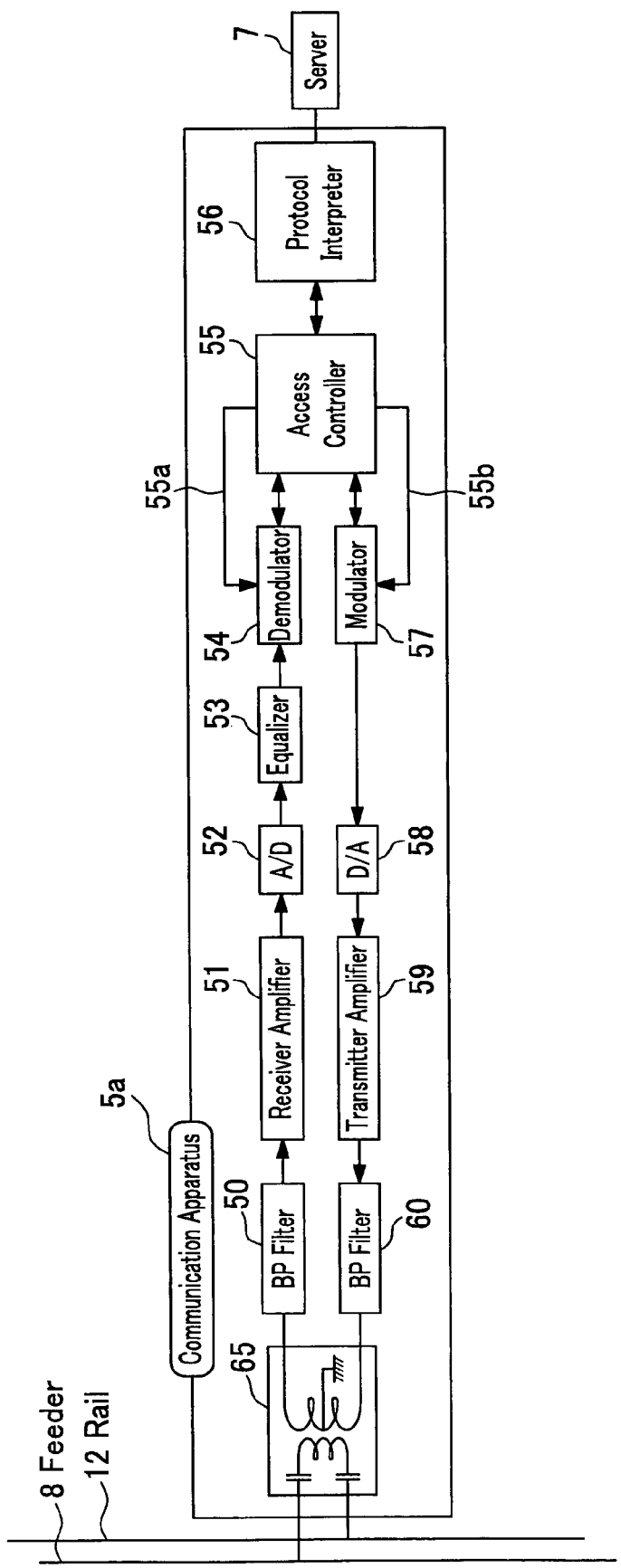
FIG. 3 is a schematic that shows the block diagram regarding the communication apparatus shown in FIG. 1.

The communication apparatuses 5*a* and 5*b* shown in FIG. 1 are same and constructed. The communication apparatus 5*a* comprises, as shown in FIG. 3, signal coupler 65, band pass filters (BP filters) 50 and 60, a receiver amplifier 51, a transmitter amplifier 59, an analog/digital converter (A/D) 52, a digital/analog converter (D/A) 58, an equalizer 53, a demodulator 54, a modulator 57, an access controller 55 and a protocol interpreter 56.

The protocol interpreter 56 functions as an inverter between the communication apparatus 5*a* and the server 7 which can be constructed by a PC so that various versatile software packages are usable. The protocol interpreter 56 interprets the files, being given by the server 7, which are the data to be provided for the service utilities of the trains into a communication protocol and format which is implemented in a form of data packet. The access controller 55 hands over the data packets to the modulator 57 after receiving the data packets from the access controller 55. The modulator 57 allocates the data to the carrier signals generated otherwise, where the data allocation information is given through another signal pass 55*b*. The data is allocated to a signal (called a data allocate signal) in which the data is ultimately allocated over whole carrier bands and the data allocated signal is converted into an analog signal by D/A 58. The analog signal is amplified by the transmitter amplifier 59 and transmitted to the communication apparatus 5*b* through the BP filter 60, the signal coupler 65, the feeder 8 and rail 12 as a voltage signal.

On the other hand, the signal transmitted by the communication apparatus 5*b* is passed and filtrated through the signal coupler 65, BP filter 50 into a communication bandwidth. The receiver amplifier 51 amplifies the filtrated signal and the A/D 52 converts the signal into a digital signal which is sent to the equalizer 53. The equalizer corrects the communication distortion of the signal and hands over the signal to the demodulator 54. The demodulator extracts the allocated data on the basis of the data allocation information 55*a* given through another signal pass 55*a* and hands over the data to the access controller 55 which reversely converts the data into a form of a packet data. The protocol interpreter 56 unpacks the packet data, converts it into a readable file and sends it to the server 7.

The data allocation information 55*a* and 55*b* sent to the demodulator 54 and the modulator 57 is not designated for a consistent data allocation. It varies in a certain time interval as estimating the S/N by training or learning the communication characteristics or evaluating the communication error rate and optimizing the data allocation for the carrier bands over the whole carrier bands. Both the estimate of the S/N and the error rate evaluation are used for the optimization of the data allocation. The dynamic assessment such as the S/N estimation and error rate evaluation for a certain time interval is useful for the communication with trains since the communication condition varies due to the speed of the train operation and construction or installation of trolley wires 9 and rails 12.

Since the communication apparatus 5*b* is constructed in a board assembly, it can be installed in narrow and small dead spaces in the cars. For example, the rooms between the ceiling and car roof or the door pockets in a door way are usable.

As shown in FIG. 2, the equalizer 53 corrects the receiving signal, which is summed up with a plurality of the signals coming via different traveling paths, to the most likely signal by optimizing the delays of the signals. The equalizer 53 can dynamically correct the received signals into an optimized signal by suppressing the effect of different delay time due to the different traveling paths. Therefore the equalizer 53 enables to correct the time-dependent communication environment such as echo canceling. In this embodiment, the equalizer 53 evaluates the communication distortion using the preamble signal embedded in the packet data and change the retardation parameter for equalizing. Therefore the output signal from the equalizer can be modified into a likely signal but the signal is not substantially improved against the noise. Therefore the equalizer does not improve S/N for the receiving signal.

Figure 4:
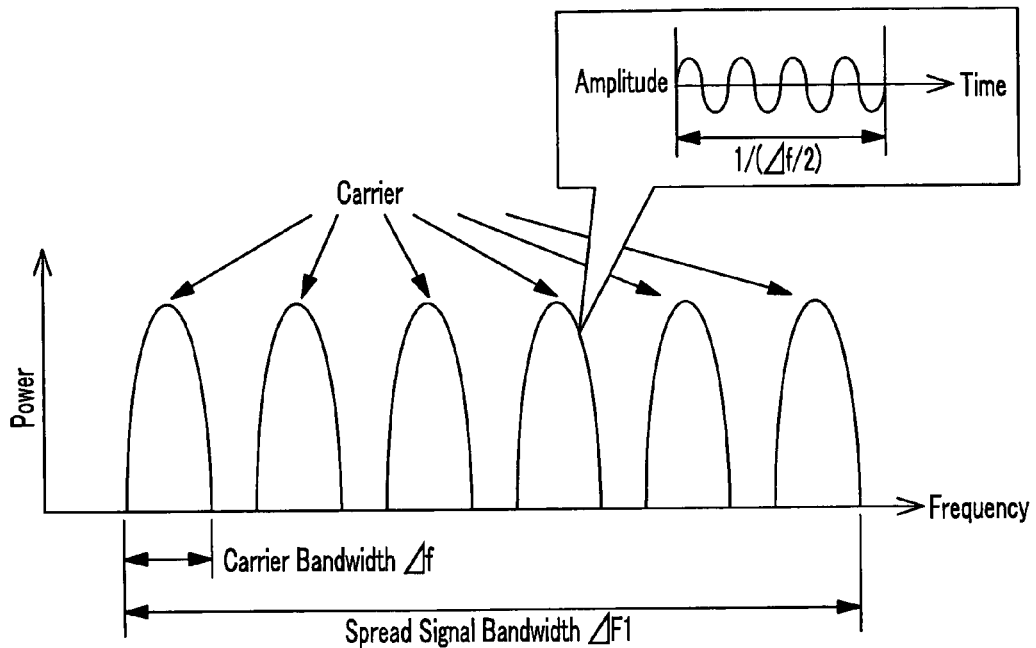
FIG. 4 shows a spectrum of the conventional multiple carrier communication.
Figure 5:
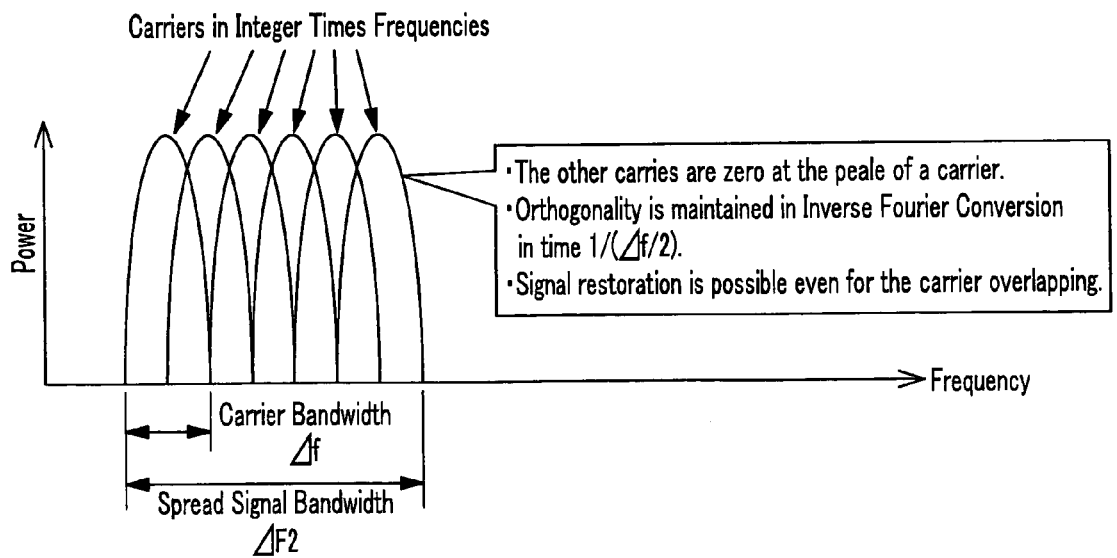
FIG. 5 shows a spectrum of OFDM.

FIG. 4 shows the multiple carrier spectrum by which the process of data allocation will be explained. In order to eliminate the overlapping of bands of the carriers, a certain gap of the frequency band is made. The predetermined data is allocated in each of frequency bands of the carriers. OFDM (orthogonal frequency division multiplexing), a specific case of the multiple carrier signal, is shown in FIG. 5 where a carrier band has a peak at which the rest of carrier bands have zero power. The orthogonality is maintained in the reverse Fourier transformation in time duration of $1/(\Delta f/2)$. The signal regeneration is possible even for carrier bands being overlapping different from the general multiple carrier spectrum and the resultant bandwidth necessary for the communication is narrow but the high usage of frequency band is allowed. The OFDM is one of the implementation of the multiple carrier.

There are two carrier communication scheme; multiple carrier communication and single-carrier communication. Both are designed that the data are allocated onto the carriers. The data allocation is restricted by the amount of the noises over the frequency bands of the carriers. The multiple carrier communication scheme has multiple narrow bands of plural carriers. Therefore if the noises generated by the feeder 8 and rail 12 have high energy in a particular frequency, the carrier whose band includes such particular frequency cannot have high S/N. Therefore the data allocation on such carrier will be reduced but large amount of data allocation onto the other carriers is possible and wide data band can be resultantly obtained so that high-speed data communication is possible. Therefore the multiple carrier communication has such a flexibility of compensation in data allocation in order to avoid the noise contaminated frequency band. But single-carrier communication scheme has no such flexibility against the noises which locates in a particular frequency which is involved in the single carrier. It is not possible to allocate much of the data onto the contaminated band. Therefore high-speed data communication is difficult in comparison to multiple carrier communication scheme. For the applications in use for railway vehicles, the data rate as more than 1 Mbps is necessary that implies the superiority of multiple carrier communication scheme.

Figure 6:
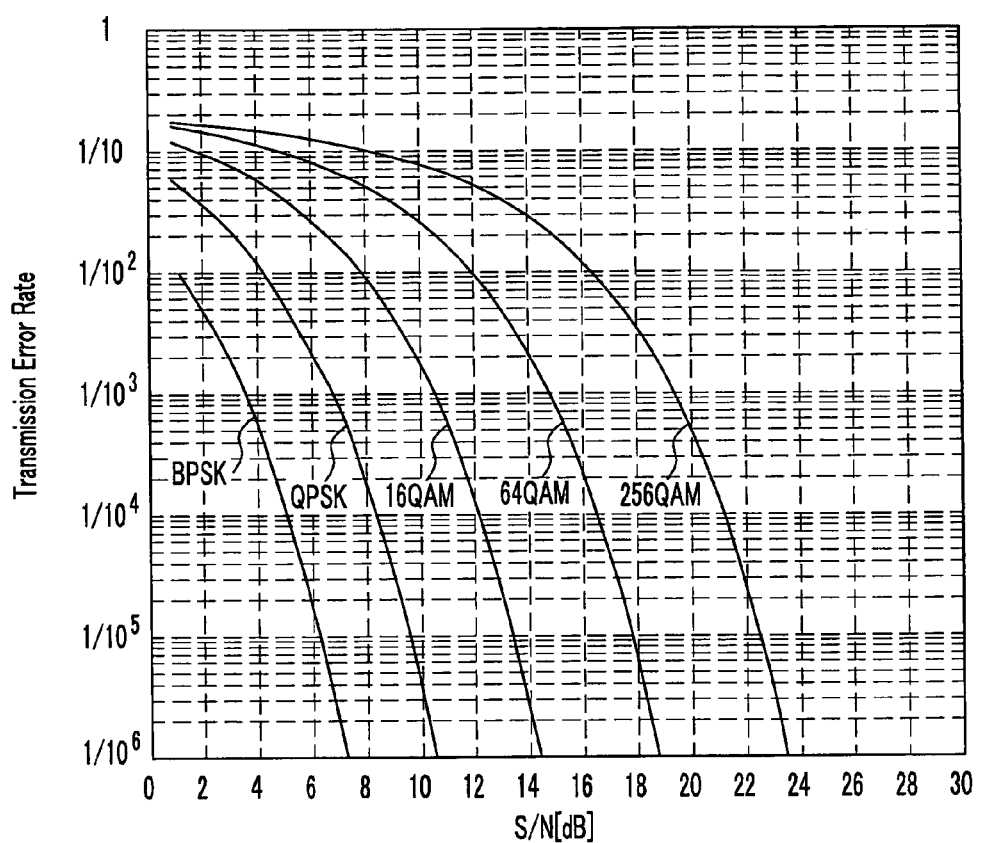
FIG. 6 shows a communication error characteristic under Gaussian noise environment against various modulation methods.

For the multiple modulation scheme, there is a limitation of data allocation as shown in FIG. 6. For example, assuming the critical transmission error rate be $1/10^5$, 256 QAM, 64 QAM, 16 QAM, APSK and BPSK have the noise immunity range in S/N as 22.5 dB, 17.7 dB, 13.5 dB, 9.5 dB and 6.3 dB, respectively. Then 64 QAM, 16 QAM, APSK and BPSK can allocate 6 bit, 4 bits, 2 bits and a single bit, respectively. For the case that S/N is less than 6.3 dB, no bit is allocated. QAM is an amplitude modulation and abbreviated by Quadrature Amplitude Modulation, QPSK a phase modulation abbreviated by Quadrature Phase Shift Keying and BPSK a phase modulation abbreviated by Binary Phase Shift Keying. There are 128 QAM and 32 QAM other than the above multiple modulation schemes. If ECC is added to above multiple modulation scheme, the error rate can be improved from $1/10^5$ to $1/10^7$. Therefore, one bit error is expected for every 10 seconds in 1 Mbps data communication speed. Resending of the data frame or the data packet may realize restoration of the correct data. Therefore it is expected a reliable communication is possible without large overhead.

Figure 7:
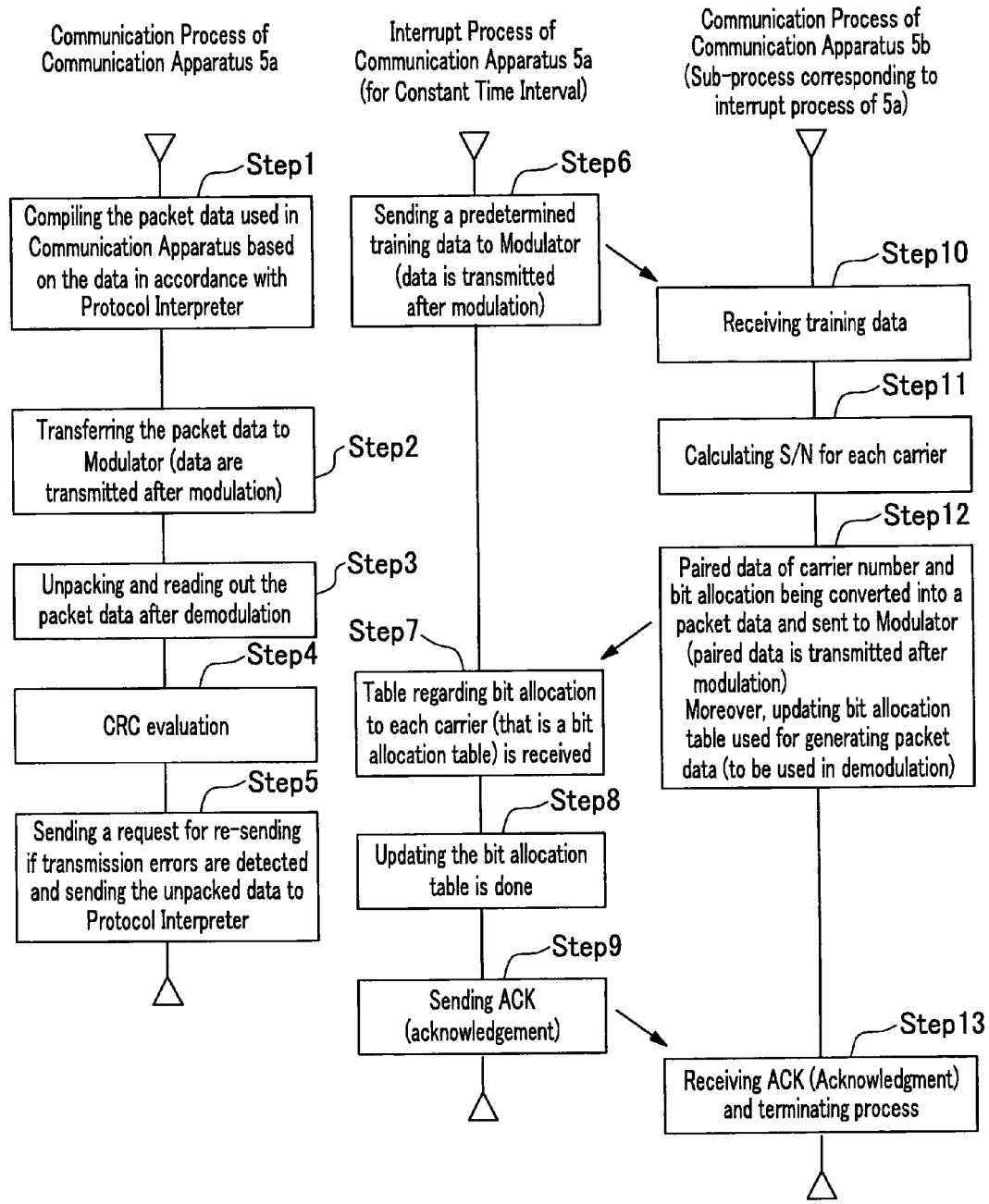
FIG. 7 is a flow chart that shows a process flow to carry the S/N evaluation for a certain time interval.

The evaluation method of S/N is explained with FIG. 7 in which S/N is calculated by transmitting the training data from the communication apparatus 5a to the communication apparatus 5b for the purpose of S/N evaluation. The S/N evaluation using the training data from the communication apparatuses 5b to 5a is carried out in the same process. The ordinal data transmission is carried out through the step 1 to the step 5 and the S/N evaluation is carried out by an interrupted process. The interruption in this embodiment is realized by an interval interruption access. The process shown in FIG. 7 is carried out by the access controller 55. In the step 1, the access controller 55 compiles the packet data by the data handed over from the protocol interpreter 56. The packet data is transferred to the modulator 57 in the step 2 and is transmitted to the communication apparatus 5b after modulation. The data transmitted from the communication apparatus 5b is received from the demodulator 54 in a form of packet data in the step 3. In the step 4, CRC (Cyclic Redundancy Check) is executed and the error detection and error rate calculation are done. In the step 5, data resending is requested to the communication apparatus 5b if a data error is detected. The data is transferred to the protocol interpreter 56 if no errors are detected.

While in the usual data communication, an interruption for S/N evaluation is carried out. The predetermined training data is outputted to the modulator 57. The training data is modulated and transmitted to the communication apparatus 5b. The communication apparatus 5b receives the training data in the step 10 and calculates the S/N for every carrier in the step 11. In the step 12, the carrier number and the quantity of the bit allocation are transformed into a packet data and sent to the modulator 57. The pair of carrier number and the bit allocation is called for bit allocation information. The bit allocation information (carrier number and the quantities of bit allocation) is transmitted to the communication apparatus 5a from the communication apparatus 5b. The bit allocation table of the communication is updated. This updated bit allocation information which is used for demodulation done in the demodulator 54. The communication apparatus 5b receives the bit allocation information in the step 7 and updates the bit allocation table in the step 8. The completion of updating the bit allocation table is sent to the communication apparatus 5b as an acknowledgement (ACK). The communication apparatus 5b receives ACK in the step 13 and ends the process. After ending this process, the communication apparatus 5b sends the training information to the communication apparatus 5a and the data transmission from the communication apparatus 5b to the communication 5a is evaluated in S/N. This evaluation is not necessary if the communication line is symmetric but effective if the communication line is asymmetric. Since the noise source such as the inverter locates in the side of the communication apparatus 5b, therefore the noise level detected by the communication apparatus 5b is larger than that by the communication apparatus 5a. Therefore the communication line may be asymmetric. Since the potential S/N in the side of the communication apparatus 5b is low, it is necessary to allocate less data onto the carriers in the data transmission from the communication apparatus 5b to the communication apparatus 5a. In this case, S/N is evaluated for both direction of the communication and both bit allocation information is stored in the access controller 55 and used for modulation and demodulation.

Figure 8:
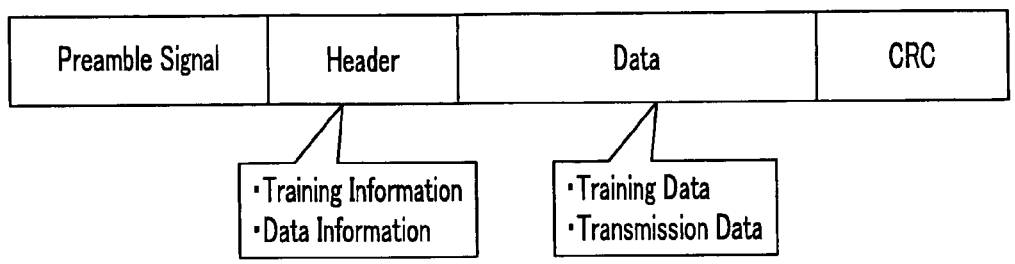
FIG. 8 shows a data format regarding the data transmission carried out in the present invention.
Figure 9:
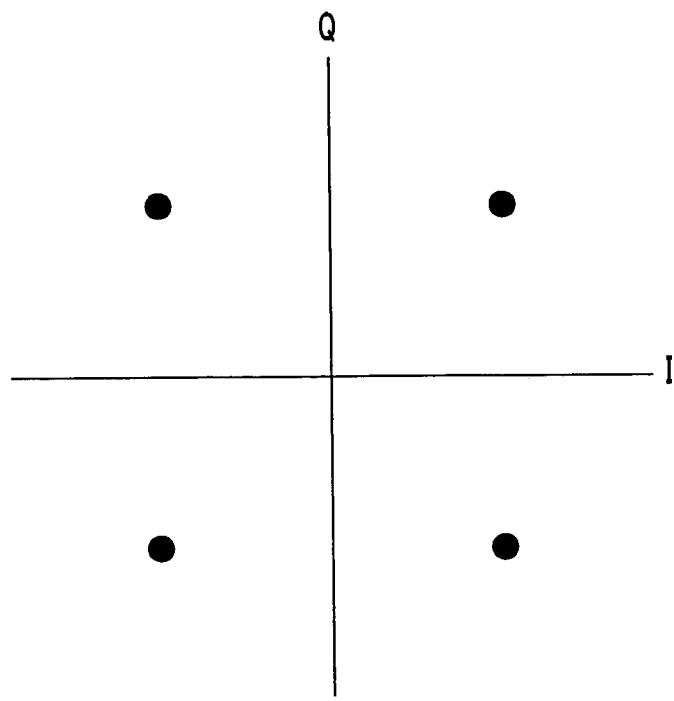
FIG. 9 shows signal position for QPSK.

As shown in FIG. 8, the training data is embedded in the data format of the packet data which is composed of a preamble signal, a header, data and CRC. The header shows whether the data are the training information or the usual content data. As for the training data, 256 QAM, 64 QAM and QPSK may be used. The detail is explained using QPSK. The preamble signal is used for the symbol synchronization. QPSK allocates 2 bits for each carrier. The signal points are given in I-Q space as shown in FIG. 9, where I axis denotes the in-phase component and Q axis orthogonal component. The bit allocation is as follows. The signal point in the primary quadrant represents data "00", the secondary "01", the third "11" and the fourth "10". It is possible to precisely evaluation S/N when the data in all quadrants are sent. For this purpose, dummy bits are used to occupy all of the quadrants.

FIG. 7 shows the training data is presented by "00", "01", "11" and "10". The modulator 57 allocates the 2 bits training data onto each carrier and transmits the modulated carriers. All of the carriers are QPSK-modulated and transmitted since the training is for the purpose of evaluating S/N of all carriers. It is designed that the training is done with QPSK modulation therefore the receiving is carried out with QPSK demodulation. The feature of the QPSK is that the signal amplitude is constant but the phase is changed in modulation and therefore the demodulation is rather simpler. Of cause, 256 QAM and 64 QAM can be used for the present embodiment.

Figure 10:
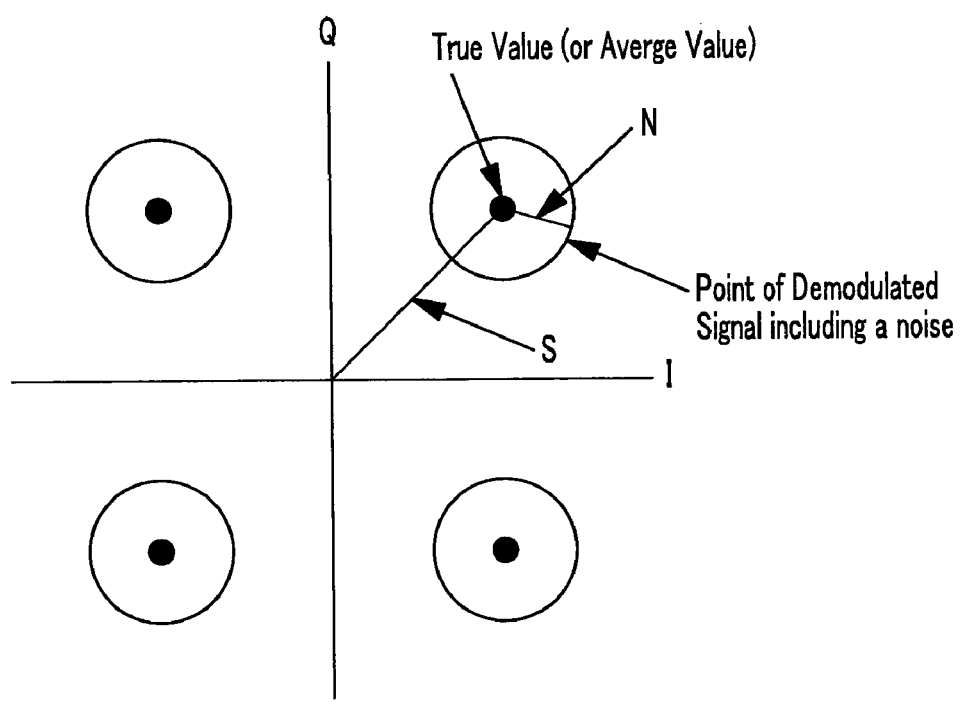
FIG. 10 shows the evaluation method for QPSK.

The SIN evaluation is explained by using FIG. 10, where the true values are shown in the case when no signal decays or no noises are found in the communication cable such as the trolley wire. If the signal decays and the signal disturbances by the noise exist in the communication, the demodulated signals after the equalizer 53 are presented as circles surrounding the true values. The actual signals after demodulation locates within the circles as shown in FIG. 10, where the distance from the origin to the signal point is the signal intensity S and the distance from the true value to the signal point of the measured signal the noise intensity N superimposing the signal. The ratio of these values is S/N. The true value of the signal can be memorized in the communication apparatus by using the two communication apparatuses and the dummy but idealistic communication cable. An alternative method is to take the average of the signal point after demodulation. The distance from the origin to the average signal position is assumed S and that from the average signal position is assumed N. It is necessary to send the training data many times to obtain a reliable estimation value of N. For the security application such as monitoring the inside of the car, the measurement of N for every picture frame of the monitoring scene is desirable, therefore the training is carried out for every 1 second which is the repetition rate of taking the monitoring scene.

Figure 11:
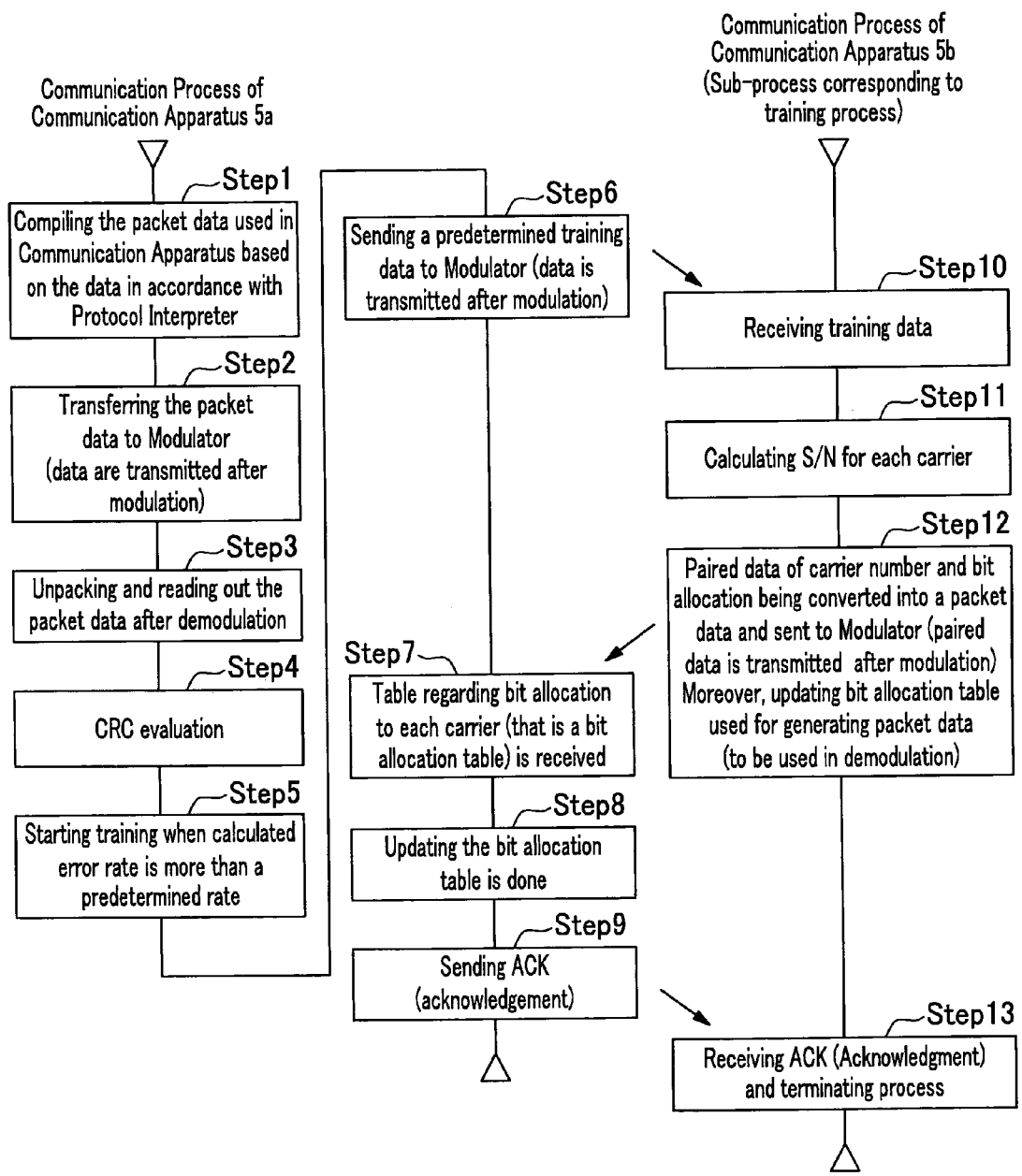
FIG. 11 is a flow chart that shows a process flow of the S/N evaluation which is performed in an event driven manner.

FIG. 11 shows a method of the event-driven training. The most difference from the training shown in FIG. 7 is that the training is carried out when the transmission error frequently happens in the usual data transmission. For this purpose, the frequency of errors calculated for every certain time duration based on the CRC results in the step 5. The training is carried out if the resultant error frequency is more than a predetermined value. The process for the training is carried out by the same steps (step 6 to step 13) as shown in FIG. 7. After completing these steps, the usual steps for communication are executed. In this process sequence, the training process is explained based on the transmission error rate for the communication from the communication apparatus 5a to the communication apparatus 5b, but the other training process is executed in reverse wise.

For this event-driven training, the overhead in the communication can be reduced since the training is done for the case when S/N is degraded. Therefore the efficiency of using the data window is higher than the constant interval training.

It may be possible to improve the efficiency of using the data window by the combination of the event-driven training and the constant interval training due to the difference of data allocations. In the high S/N, the constant interval training is adopted where the data allocation is compliant to that for the high-speed communication. On the other hand, the data allocation for the event-driven training is compliant to that for improving the error rate so that the data allocation is less effective than that adopted for highs S/N communication. Therefore the combined use of the even-driven training and the constant interval training can provide an optimum data allocation to meet the status of S/N. The whole process of the communication can be done with that including the event-driven training as shown in FIG. 11 and that alternated with the steps adopted for constant interval training as shown in FIG. 7.

By using OFDM as well as multiple carrier signal scheme, the data allocation can be shared to other carriers than one carrier which includes a high noise in the band therein. Therefore high data rate more than 1 Mbps is obtainable in the whole bandwidth. Each carrier band is strictly confined not to interfere the adjacent carrier bands, it is possible to obtain the data transmission in a relatively narrow frequency band. Therefore even when the inverter noise changes the noise frequency over a certain range of the frequency domain in time-variant manner, OFDM can dynamically select the carriers which have less effect from such time-varying inverter frequency. As the result, OFDM can maintain the high rate communication for rather such time-varying noisy environment. This advantageous characteristic of OFDM in the present invention has been experimentally confirmed and another reason behind such experimental result is the OFDM robustness against the time-variant imbalance of frequency characteristics of the communication lines.

The S/N evaluation for a single carrier communication can be done in the method as shown in FIG. 10 for QPSK. The training can be carried out in the same process as those shown in FIG. 7 and FIG. 11. The high-speed communication is possible by using wide frequency band since the data is widely allocatable in the frequency domain.

In addition, a frequency hopping method is explained. In FIG. 7 and FIG. 11, the data allocation is changed against the S/N evaluation results. It is also possible to hop the frequency to a frequency band where the similar or higher S/N is obtained instead of allocating the data for improving S/N. In this method, the frequency hopping information is sent from the access controller 55 to the modulator 57 and demodulator 54 in stead of sending the data allocation information through 55a and 55b. For the actual use of this method, the possible bands into which the frequency is hopped are determined by measuring S/N. The implementation of this method is easy since a single carrier is used for single carrier communication. The possible frequency range is necessary to be wide enough so that the frequency can hops within the range.

Figure 12:
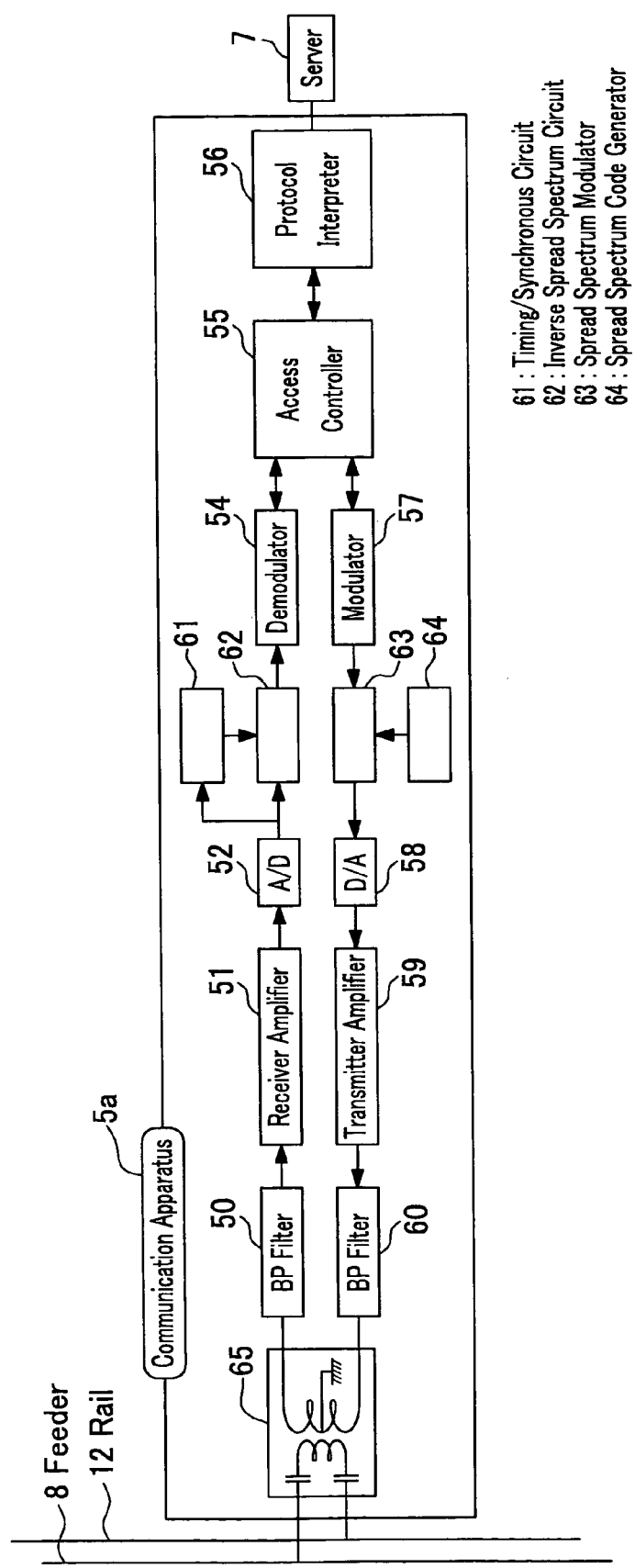
FIG. 12 shows a block diagram that is suitable for spread spectrum communication.

An embodiment suitable to implement the spread spectrum communication method will be explained, where a pair of the communication apparatuses 5a and 5b is used and the communication apparatus 5a is adopted in FIG. 12. The same portions of FIG. 3 are omitted in FIG. 12. The differences from FIG. 3 are the portion related to the modulator 57 and the demodulator 54 and the rest portions are same. In the multiple carrier spectrum method including OFDM, bit allocation is done for each barrier. However the spread spectrum method widens the base band over the spread spectrum range, sends in such a widen bandwidth and transceives in such a band width. In demodulation, the band width is compressed into the base band and data restoration is carried out. The spread spectrum communication can keep S/N in high level and is superior in case that a random noise is superimposed in the communication, for example, the noise generated by an inverter which has a specific frequency (called frequency selective noise) is dominated over other noises. The differences from FIG. 3 are explained. The modulator 57, called as the primary modulator for spread spectrum communication method, adopts the widely used conventional modulation such as amplitude modulation, frequency modulation, and phase modulation (BPSK, QPSK) and dual modulation such as 16 QAM, 64 QAM and 256 QAM, etc. The primary modulated signal which is an output from the modulator 57 is sent to the spread spectrum modulator 63 and multiplied with a PN (Pseudorandom Noise) sequence generated by spread spectrum code generator 64 and the resultant signal is handed over to D/A 58. This PN sequence multiplication can be done by the analog fashion and no D/A 58 is necessary for such analog process. The spread spectrum modulation signal is transmitted to the communication apparatus 5b from the communication apparatus 5a. The frequency band width is a summation of that of the primary modulation signal and that of the PN sequence. Therefore the actual communication bandwidth is necessary to be wider than the frequency bandwidth of the primary modulation signal (which is the frequency width of base band). The frequency spreading rate is usually more than 5 times larger than the primary modulation signal however it is preferable to be more than 10 for the railway application since the noise level in the carrier is higher in comparison to the conventional power line carrier communication. Therefore the actual communication bandwidth should be more than 10 MHz since 1 MHz base band is necessary for the railway vehicle data services as previously described. According to the noise analysis shown in FIG. 2, the frequency range higher than 5 MHz is preferable for the carrier frequency. Therefore it is preferred that the lowest frequency in the communication bandwidth should be higher than 5 MHz.

The process for the demodulation for the spread spectrum communication method is explained as follows. The output signal from A/D 52 is sent to the timing/synchronous circuit 61 and the inverse spread spectrum circuit 62. The output signal from the A/D 52 is multiplied with the identically same PN sequence with that used for the transmission circuitry in the inverse spread spectrum circuit 62 and then the primary modulation signal is restored. This process is called bandwidth compression where the signal components are enhanced and the frequency selective noises are suppressed. Therefore the signal after the demodulator 54 has large S/N and facilitates the restoration of the original source signals. The timing/synchronous circuit 61 takes synchronization in the multiplication between the signal from A/D 52 and PN sequence. When the timing/synchronous circuit 61 and the inverse spread spectrum circuit 62 are realized by an analogy circuitry, then A/D 52 is not necessary.

In this spread spectrum communication method, the training necessary for bit allocated executed in the multiple carrier communication method is not required. Therefore the spread spectrum communication method features to have no interruption of the actual data transmission.

Figure 13:
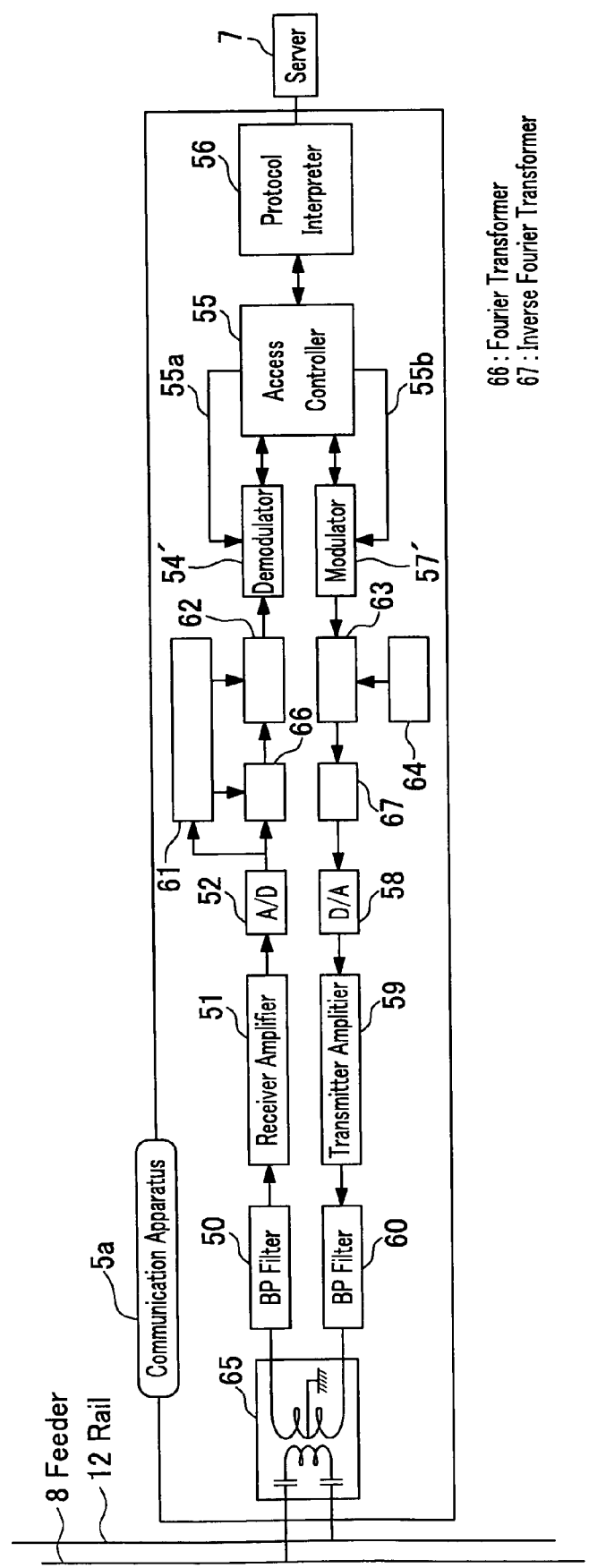
FIG. 13 shows a block diagram that is suitable for both OFDM and spread spectrum communication.

FIG. 13 shows a combined communication method with OFDM communication method and the spread spectrum communication. The differences from FIG. 3 and FIG. 12 are the portion relating to the modulator 57' the demodulator 54' the spread spectrum modulator 63 and the inverse spread spectrum modulator 62. The rest portions are same. The modulator 57 and the demodulator 54 shown in FIG. 3 carry out inverse Fourier transformation (IFFT) and Fourier transformation (FFT) for the purpose of orthogonalization of each carrier. In the present combined communication method with OFDM communication method and the spread spectrum communication as shown in FIG. 13, the inverse Fourier transformation (IFFT) and the Fourier transformation (FFT) are not carried out in the modulator 57' or the demodulator 54', respectively but in portions between the inverse spread spectrum modulator 62 and the A/D 52 and between the spread spectrum modulator 63 and the D/A 58. By this circuit configuration, the I value and Q value in the output from modulator 57' is multiplied (spread) with the spread code of the PN sequence at the spectrum modulator 63. The orthogonality amongst the sub-carriers is maintained by inverse-Fourier transforming in the inverse-Fourier transformer 67. The orthogonal signal is sent to D/A 58. As the result, large amount of data can be transmitted in a limited frequency bandwidth. In case of receiving signal, the output signal from A/D 52 is sent to the timing/synchronous circuit 61 and the Fourier transformer 66. The spread primary modulation signal is obtained by Fourier transformation (FFT) carried for the input signal in the Fourier transformer 66. In the inverse spread spectrum modulator 62, the spread primary modulation signal is restored by the multiplication with the identically same PN sequence used in the transmission circuitry. This process is called inverse spread spectrum modulation. By the restoring compression, the signal is enhanced and the selective noises such as those from the operating inverters are suppressed. Therefore the signal after the demodulator 54' has large S/N and facilitates the restoration of the original source signals without serious noise contamination. The timing/synchronous circuit 61 takes synchronization in Fourier transformation in the Fourier transformer 66 and the multiplication with PN sequence in the inverse spread spectrum modulator 62. In the embodiment for the transmission circuitry, the inverse-Fourier transformer 67 and the Fourier transformer 66 are placed between the spread spectrum modulator 63 and the D/A 58 and between A/D 52 and the inverse spread spectrum circuit 62, respectively. Therefore the orthogonality amongst the sub-carriers is maintained. However if the inverse-Fourier transformer 67 and the Fourier transformer 66 are placed in the modulator 57' and the demodulator 54', respectively, no orthogonality amongst the sub-carriers is maintained and correct data cannot be appropriately communicated. The orthogonalized sub-carriers have the frequency distribution such that the distribution is zero at the peak energy of the adjacent sub-carrier. However this signal composing of such sub-carriers cannot maintain this non-overlapping characteristic. In order to prevent this phenomenon, the inverse-Fourier transformation is carried out after the spread spectrum modulation and the inverse-spread spectrum modulation after Fourier transformation, respectively. As the results, this method supports large capacity communication even for railway vehicle application where signal decay is not predicted or the signal is heavily contaminated with environmental noises.

Figure 14:
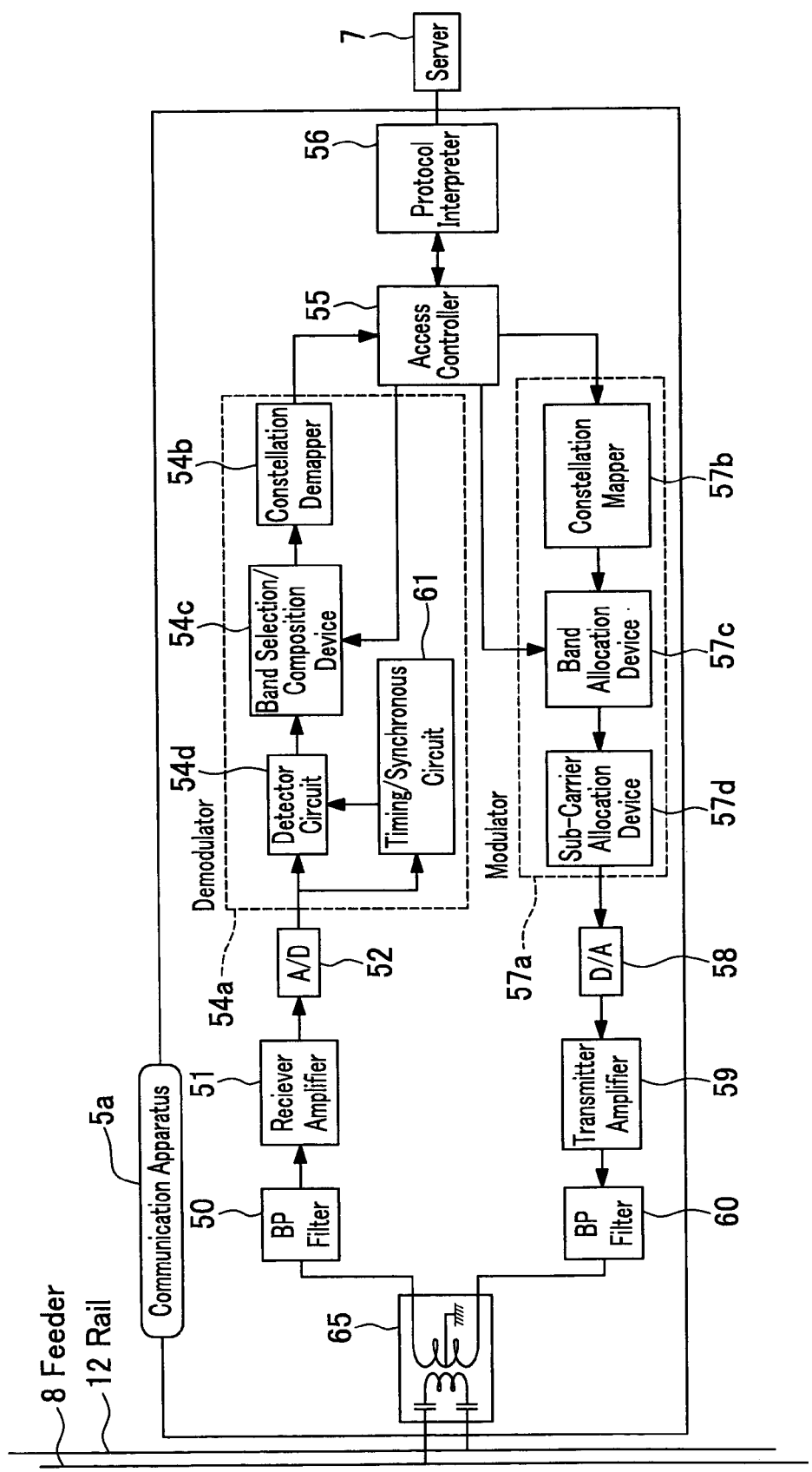
FIG. 14 is a block diagram that is to allocate data to be transmitted.
Figure 15:
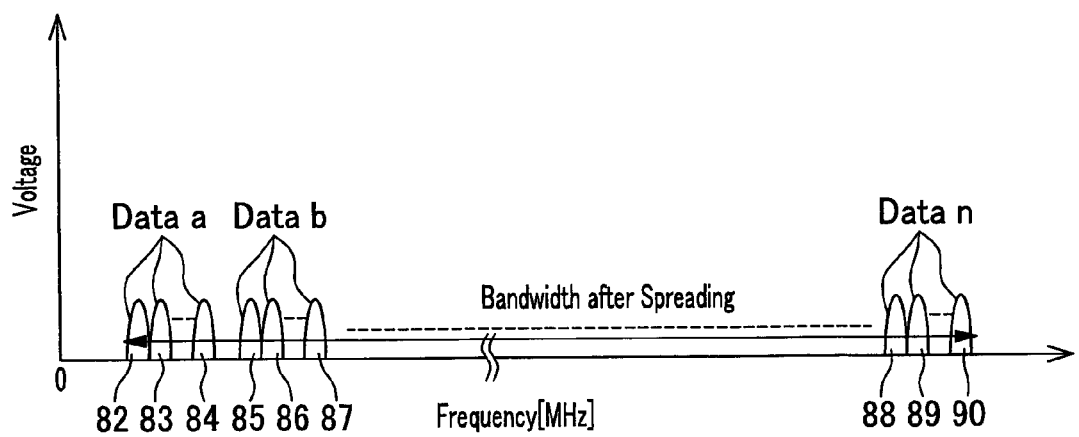
FIG. 15 shows a chart that shows a distribution of sub-carriers to which identically same data are allocated in spread spectrum of plural sub-carriers.
Figure 16:
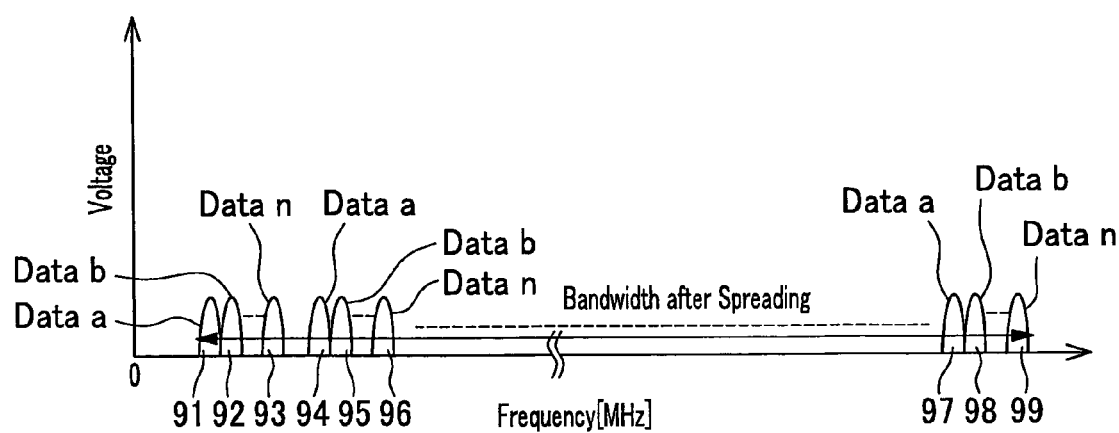
FIG. 16 shows a chart that shows a separative distribution of sub-carriers to which identically same data are allocated in spread spectrum of plural sub-carriers.

FIG. 15 shows an embodiment of the data allocation onto sub-carriers without interference, where the sub-carriers having the same allocated information are seen not to overlap each other. FIG. 16 shows another data allocation scheme where the data allocation is further diverted over the neighboring sub-carriers. FIG. 14 shows the circuitry diagram of the communication apparatus 5a that realizes the spread spectrum shown in FIG. 15 and FIG. 16.

The data sent from the access controller 55 are modulated for QPSK (as shown in FIG. 9) and converted into I-value and Q-value at constellation mapper 57b. These I-value and Q-value are sent to the band allocation device 57c where the output from the constellation mapper 57b is duplicated on the basis of the data mapping information sent from the access controller 55 and the duplicated signal is sent to carrier allocation device 57d. The data mapping information defines the mapping of data to sub-carriers. The sub-carrier allocation device 57d multiplies the QPSK modulated data with sub-carriers and sent the resultant signal to D/A 58.

The function of the demodulator 54a is explained. The analog receiver signal is sampled by A/D 52 and the each composing sub-carrier is detected by the detector circuit 54d. The output from the detector circuit 54d are, as shown in FIG. 15 and FIG. 16, I-value and Q-value obtained by sub-carriers to which same data are allocated. For example, data a is composed of plural I-values and Q-values (called as diversity branches) including the same data. The output from the detector circuit 54d is sent to the band selection/composition device 54c where the selection or composition of the diversity branches is done on the basis of the data mapping information received from the access controller 55. The result is sent to the constellation demapper 54b. The band selection/composition device 54c is realized in one of the predetermined configuration as selective composing method, equigain composing method or maximum rate composing method. The selective composing method sends the constellation demapper 54b the maximum receiving signal by comparing the signal receiving levels of all diversity branches. The equigain composing method sends the constellation demapper 54*b* the added value or the average value of all diversity branches after in-phase adjustment for all diversity branches. The maximum rate composing method sends the constellation demapper 54*b* the summation value of all diversity branches weighted with the coefficients determined by the communication environment (such as the degree of fading or S/N). The constellation demapper 54*b* extracts the data by identifying the signal with the signal points as shown in FIG. 10 in response with the I-values and Q-values obtained by the identified data which is selected or composed in the band selection/composition device 54*c* and then send the resultant data to the access controller 55.

As shown in FIG. 15, for example, the information (such as data a) is allocated onto the sub-carriers 82, 83 and 84 which are adjacent but not overlapped in the frequency domain. Other information (such as data b and data n) is allocated to a group of sub-carriers 85 to 87 and a group of sub-carriers 88 to 90.

Therefore this method can make the total bandwidth relatively narrower due to the optimization of data overlapping in comparison to the direct data allocation to the carriers. This method is more effective to suppress frequency selective fading, which is particular problems of the power line carrier communication, into the flat fading so that the reliability of the communication can be improved. The transmission signal in the power line has decays in frequency domain in a random fashion. It may happen that one sub-carrier is not detected due to the decay. However the same data are allocated onto other sub-carriers and it is possible to restore the transmission data by these sound sub-carriers. This serves the consistent communication even in such decaying conditions.

FIG. 16 shows another implementation of data allocation onto the sub-carriers where the data allocation is further diverted over the neighboring sub-carriers. For example, the information (data a) is allocated onto the sub-carriers 91, 94 and 97. The separation of these sub-carriers are from tens KHz to hundreds KHz which are arbitrarily determined and no interference of the sub-carriers are made. This diversion is difference of data allocation between that in FIG. 15 and that in FIG. 16.

This data allocation scheme realizes a robust communication in addition to the features obtained in the data allocation shown in FIG. 15. For example, a loss of the sub-carrier and wide decay in a range of few tens KHz to several hundreds KHz are made therearound, which specifically happens to the power line carrier communication. According to the experimental results, the sudden loss of sub-carriers has about 100 KHz range of the central frequency. Therefore many of the neighboring sub-carriers to which the same data are allocated decay the signal level. Therefore there is a potential risk of increase of the bit error rate. For the data allocation shown in FIG. 16, the sub-carriers to which the same data are allocated are diverted in wide frequency range. It hardly happens that all of these sub-carriers are decayed therefore it is possible to prevent the data loss by such wide range of diversion of the sub-carriers. As the result, this method succeeds to restore the transmitted data and to serves for the consistency of communication.

By using this data allocation scheme, the data are allocated onto plural sub-carriers and the some of those localized sub-carrier have sufficient S/N even in frequency band below 1 MHz. Therefore the communication is possible even by such a relatively low frequency communication. For high-speed communication, more sub-carriers are used.

Figure 17:
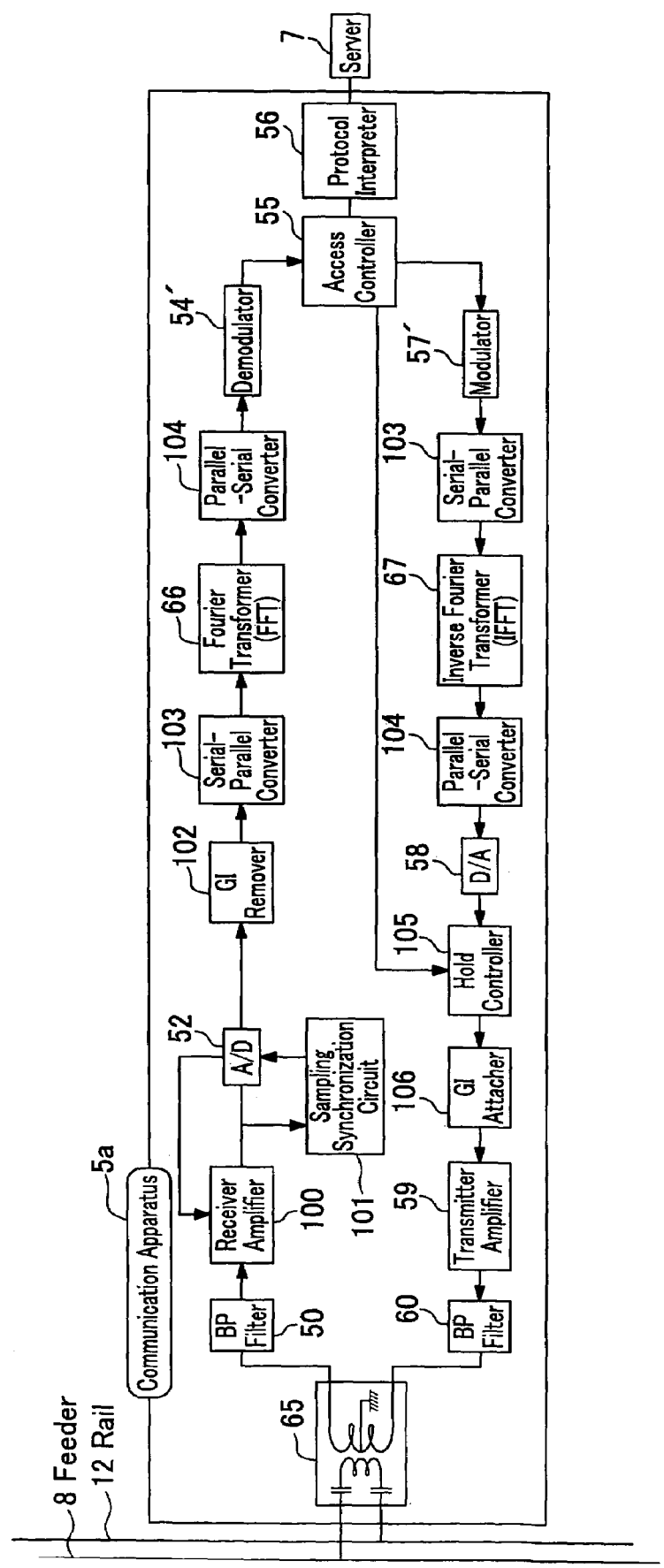
FIG. 17 shows a block diagram of communication device that is suitable for spread spectrum communication by sampling OFDM output signal.

FIG. 17 shows the block diagram of the circuitry used for the OFDM sampling spread spectrum method. The communication apparatus 5*a* has the serial-parallel converter 103, the inverse Fourier transformer (IFFT) 67, parallel-serial converter 104, D/A 58, the hold controller 105 and GI (Guard Interval) adder 106 in the transmitter circuitry. The communication apparatus 5*a* has the receiver amplifier 100, sampling synchronization circuit 101, A/D 52, GI remover 102, serial-parallel converter 103, a Fourier transformer (FFT) 66 and a parallel-serial converter 104 in the receiver circuitry. In the transmitting phase, the data handed over to the serial-parallel converter 103 is converted into parallel data which is OFDM-modulated by means of the inverse Fourier transformer 67. Then the parallel-serial conversion is done then the analog signal is obtained after D/A 58.

Figure 18:
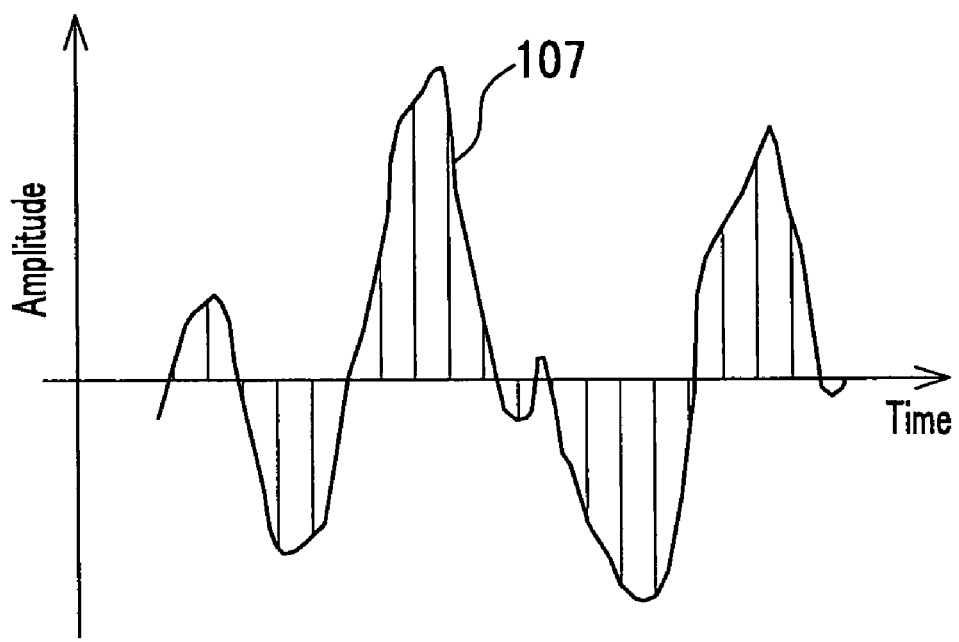
FIG. 18 shows the output signal of the hold control device

FIG. 18 shows the shape of the output signal from the hold controller 105. The hold controller 105 converts the output from D/A 58 into a signal in series of impulses or pulses that has the holding time duration. The signal is given as an output wave shape 107 of hold time controlling circuit. The hold controller 105 has a means to control the hold time, which can be done by using a sample/hold semiconductor device (not shown in the figures).

Figure 19:
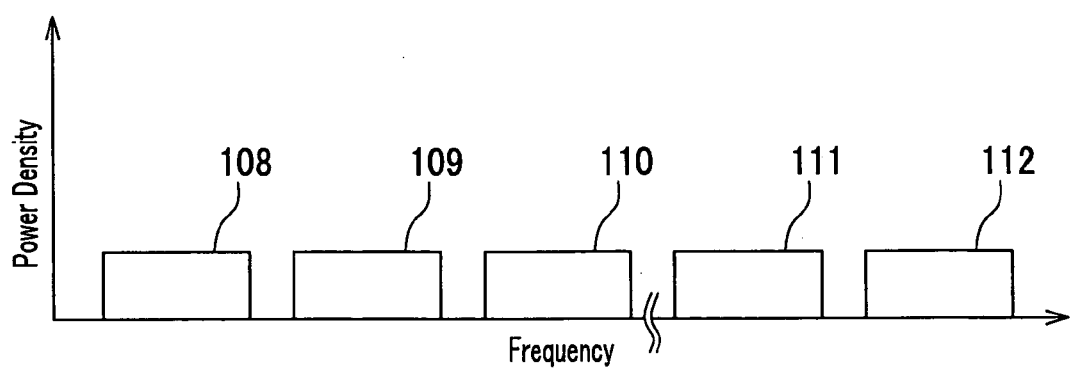
FIG. 19 is a conceptual chart that shows the frequency spectrum of the hold control device.

FIG. 19 shows a conceptual drawing of the frequency spectrum of the hold time controlling circuit output signal (OFDM signal wave form). Narrowing the hold duration time to make pulse shape or the impulse shape, the spectrum of the OFDM signal is obtained in a periodical distribution such as the lobes 108 to 112 as shown in FIG. 19. A series of modulation and demodulation done by high performance DSP (Digital Signal Processor) and CPU (Central Processing Unit) are required for the purpose of the spectrum spreading and band allocation in proportion to bandwidth of the spread spectrum.

According to the present invention, the operation performance of the OFDM modulation is enough to process the base band. The burden to the DSP and CPU is not large since the spreading and the band allocation are supported by the hold controller 105, which results in low cost manufacturing of the communication apparatus 5*a*.

The receiver function as the OFDM demodulation is explained in the following. The communication apparatus 5*a* receives the transmission signal sent by another communication apparatus. The received signal is filtrated by the BP filter 50 to remove the signals in the outer bands and then amplified by the receiver amplifier 100 to be gain-adjusted to meet the A/D input level. At the same time, the sampling clock synchronization is carried out to synchronize the non-zero data (corresponding to the output mode of the D/A 58) with the sampling clock used for A/D 52. The non-zero signal portion of the signal that has passed through the receiver amplifier 100 at the A/D 52 on the basis of the synchronous signal. Since the synchronization is carried out for the non-zero portion, A/D 52 is enough to have a process capability for the base band.

In the series of process done in the circuitry shown in FIG. 17, plural same spectra 108 to 112 are generated and the signal in such spectrum is sent. Therefore the communication reliability is improved due to the frequency diversity at the receiver. At the same time, the scheme support to reduce the performance necessary for the DSP or CPU working for spectrum spreading. In the receiving phase, the noises in the window of the null values are not sampled, the inverse spreading effect, that is, S/N in the demodulation is more improved than that in the modulation, can be obtained.

Figure 20:
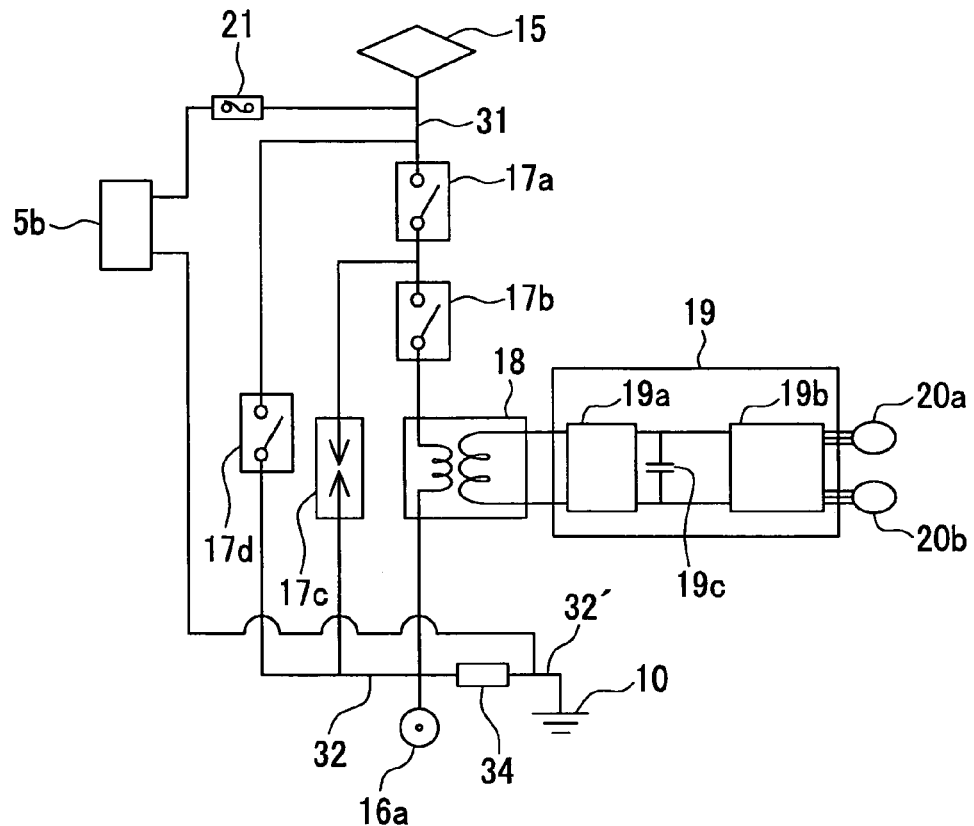
FIG. 20 is a circuit diagram of the communication apparatus applied for AC powered electric trains.

FIG. 20 shows an example of installation of the communication apparatus 5*b* into an AC electric car and the relevant circuit configuration. The circuit linkage between the power supply circuit (generally called main circuit) including the protection circuit 17 and the communication apparatus 5b is shown. The power supply line is connected to a protection ground device 17d through the pantograph 15, the power cable 31 and a vacuum breaker 17a. The vacuum breaker 17a is connected to the line switch 17b and a lightening arrester 17c. The line switch 17b is connected to a transformer 18 which is connected to the wheel 16a through the power cable 32 and to the vehicle body 10 through a ground resistor 34 and power cable 32'. The line switch 17b and the lightening arrester 17c are connected to the wheel 16a as well. The ground resistor 34 is to suppress the stray current. However the transformer 18 is directly connected to the vehicle body 10 and the wheel 16a without the ground resistor 34 for some other vehicles. The ground resistor 34 has resistance of about 0.5 ohms. The vacuum breaker 17a, the line switch 17b, the lightening arrester 17c and the protective ground device 17d work as the protection circuit 17 (see FIG. 1). The communication apparatus 5b is connected to the power cable 31, through a fuse 21, which is ultimately connected to the pantograph 15 and to vehicle body 10 or another power cable 32' which is connected to the ground resistor 34. Therefore, the communication is not shut off even when the vacuum breaker 17a and the line switch 17b are opened. The fuse 21 is broken when the communication apparatus 5b is electrically shorted and the main circuit is not affected by the shortage. A converter/inverter (C/I) 19 is connected to the secondary of the transformer 18. The ground resistor 34 suppresses the switching noise flowing into the communication apparatus 5b. Therefore a port of the communication apparatus 5b is connected to the wheel 16a through ground resistor 34 as shown in FIG. 20. Since the resistance of the ground resistor 34 is 0.5 ohm, alternative connection to the power cable 32 connected to the wheel 16a may be used. The transformer 18 has stray capacitance in the winding coils. Therefore the communication signal in mega Hertz frequency band is shunted by the transformer which is connected to the communication apparatus in parallel. In general the cables have inductance so that several ohms or tens ohms are obtained for the cable length of several meters to ten meters for the frequency of 1 MHz to 30 MHz. Therefore, a long cable is used between the communication apparatus 5b and the transformer 18. This cable inductance reduces effect of the stray capacitance. The effects of stray capacitance will be explained later in FIG. 22. The converter/inverter (C/I) 19 comprises a converter 19a, capacitor 19c and an inverter 19b. Though the protection circuitries are slightly different among vehicles, the fundamental configuration is same and the circuit in this invention can be modified in the art that variations and modifications may be made thereto without departing from the scope of the present invention.

Figure 21:
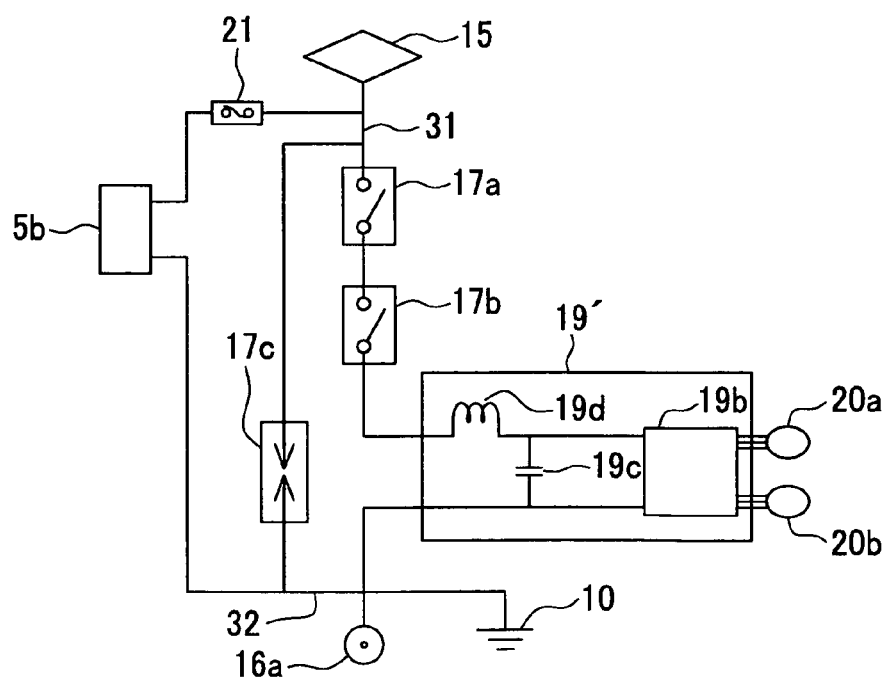
FIG. 21 is a circuit diagram of the communication apparatus applied for DC powered electric trains.

FIG. 21 shows an embodiment of the installation of the communication apparatus 5b for a typical DC electric car. The connection of the communication apparatus 5b is fundamentally same as that shown in FIG. 20 and the similar effect is obtained. The lightening arrester 17c connected between the power cable 31 and 32 (or vehicle body 10). The inverter 19' is composed of an inverter 19b and a filter constructed with a reactor 19d and a capacitor 19c. There are several variations in the protection circuitry for the other cars, however the fundamental construction is same and the present invention is applicable to such variations.

For the DC electric cars, the power substation uses converters to generate DC power and the spike noises (called switching noises) generated by the converters are superimposed to the DC power. In order to reduce the effect of these spike noises, the communication apparatus 5a may be set in the stations, complex station buildings and station yards. Then the communication between the electric cars and these station facilities has less effect of such noises. The frequency characteristics of these noises depend on the converter circuit types, however it is confined in up to rather low frequency as several hundred KHz. On the other hand, the frequency of the power line carrier is set in a MHz band and therefore the communication apparatus 5a of the present invention has less effect from such converters. This is true for the present invention in the mono-rail application.

Figure 22:
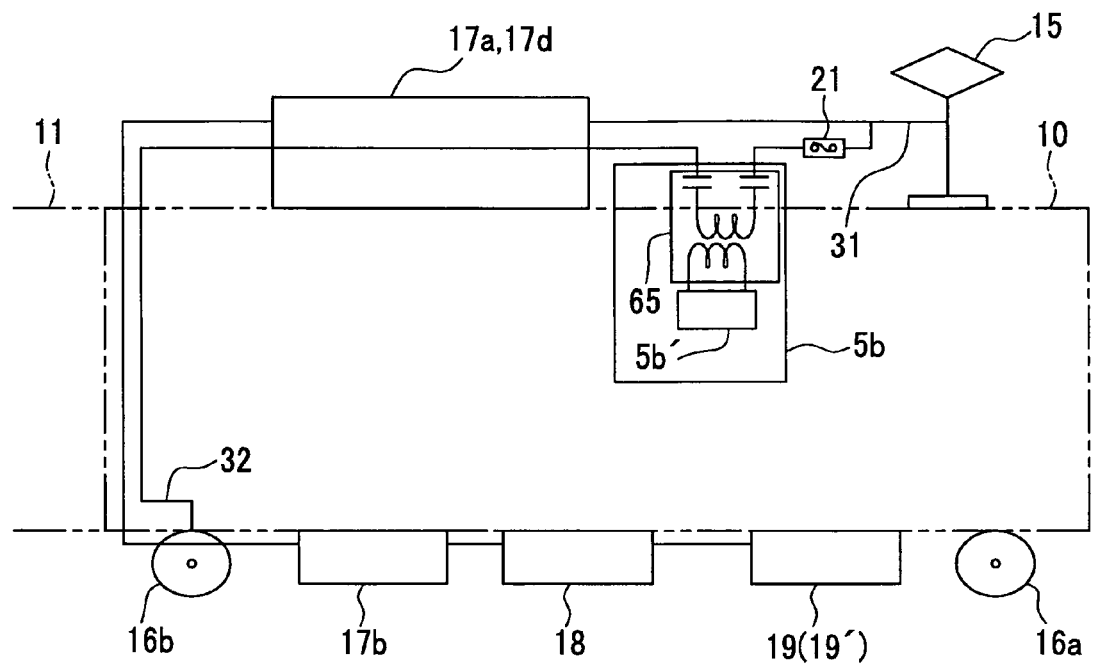
FIG. 22 shows an example of the installation of the communication device into an electric car.

FIG. 22 shows examples of installation of the present communication apparatus 5b to the AC electric cars (it is same for the case of DC electric car). The vacuum breaker 17a and the protective ground device 17d are set on the roof of the vehicle and the line switch 17b, the transformer 18, the converter/inverter 19 (19') are sent underneath the floor. The converter/inverter 19 (19') is sometime set in adjacent cars. The transformer 18 is not used for DC electric cars. The capacitor of the signal coupler 65 which is a component of the communication device 5b is set on the roof of the vehicle and the transformer of the signal coupler 65 and the other signal processing unit 5b' are set in the vehicle body 10. This is for the purpose of the safety against the high voltage applied to the capacity and the maintainability of the signal processing unit 5b' to be connected with other peripheral devices (such as displays and servers). The whole of the communication apparatus 5b is connected to the power cable 31 at the side of the pantographs 15 and another power cable 32 at the side of the wheel 16b (or 16a). The power cable 32 is connected to both the vehicle body 10 and the wheel 16b (or 16a). Since the lengths of the car body are 20 meters and 25 meters for the conventional trains and Shinkansen, respectively, the total length of the power cable 32 from the communication apparatus 5b to the wheel 16b is several meters to several tens meters. Therefore, it is possible to suppress the effect of the stray capacitance of the transformer 18. For further safety reason, the signal coupler 65 may be set on the roof and the signal processing unit 5b' in the vehicle body 10.

In case of the DC electric cars, the potential voltage of the rail is zero anywhere the rail 12 is set. One of the capacitors of the signal coupler 65, which is in the rail side, may be removed and directly connected to the rail 12. Then the DC resistance of the transformer is substantially zero so that the connection between the primary and the secondary in accidents may not lead the high voltage applied to the secondary and keep the potential voltage of the secondary in zero voltage. Therefore no break of the communication apparatus 5b even in such accident is made. This is true for the application of the monorail. In other words, the same effect can be obtained for the monorail electric car when the capacitor in the side of the wheels or car bodies is removed and the primary is connected to the rail wheel side.

The signal processing unit 5b' of the communication apparatus 5b is installed in the hollow gap between the inner wall and the outer chassis of the car. In other words, the gap between the ceiling and the roof (the external of the car), the gap between the external floor and the interior floor or the door pocket is usable since such gap has a dual construction provided by a hollow space. It is not necessary to make another room for the installation or does not damage the outer look when we use such gap.

Figure 23:
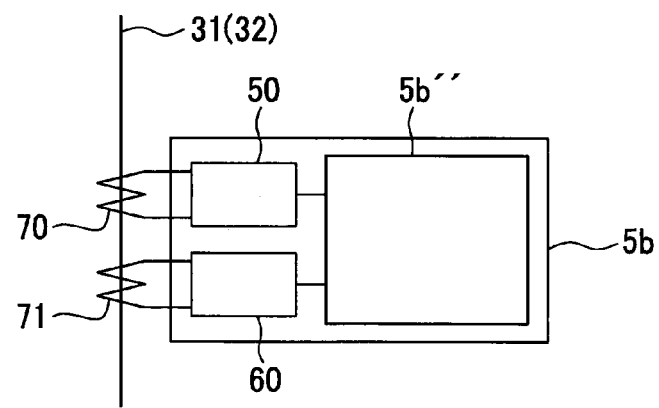
FIG. 23 shows another embodiment of the coupling device.

FIG. 23 shows another coupling method with power line carriers. There are two magnetic field couplers 70 and 71 which make a magnetic field coupling between the power cable 31 and the communication apparatus 5b and input a current signal to the circuit power 5b" which is a portion of the communication apparatus 5b from which the signal coupler 65, BP filters 50 and 60 are eliminated. There is no direct coupling with the power cable to which a high voltage power is supplied. The communication apparatus 5b is isolated form the high voltage and no high voltage capacitors are required for the signal coupling. The shortage in the communication apparatus 5b makes no effect onto the power cable 31 or 42 and therefore the fuse 21 is not required, which contribute the cost down since the high voltage fuse device takes a large cost. The magnetic field couplers 70 and d71 can be cramp couplers by which the couplers are easily installed without cutting the power cables 31 and 32. By setting a gap in the magnetic path of the magnetic field couplers 70 and 71, the magnetic saturation due to the commercial power line or the DC power line cannot be a problem.

There is another power supply method other than the trolley wire 9. It can be done by a third rail and the conventional rails 12. The pantograph 10 (may be called a collector) sliding on the third rail collects the electric power. The pantograph 10, the third rail and the rail 12 make a communication line and the other elements for the embodiment are same. This configuration is applicable to the following embodiment.

Figure 24:
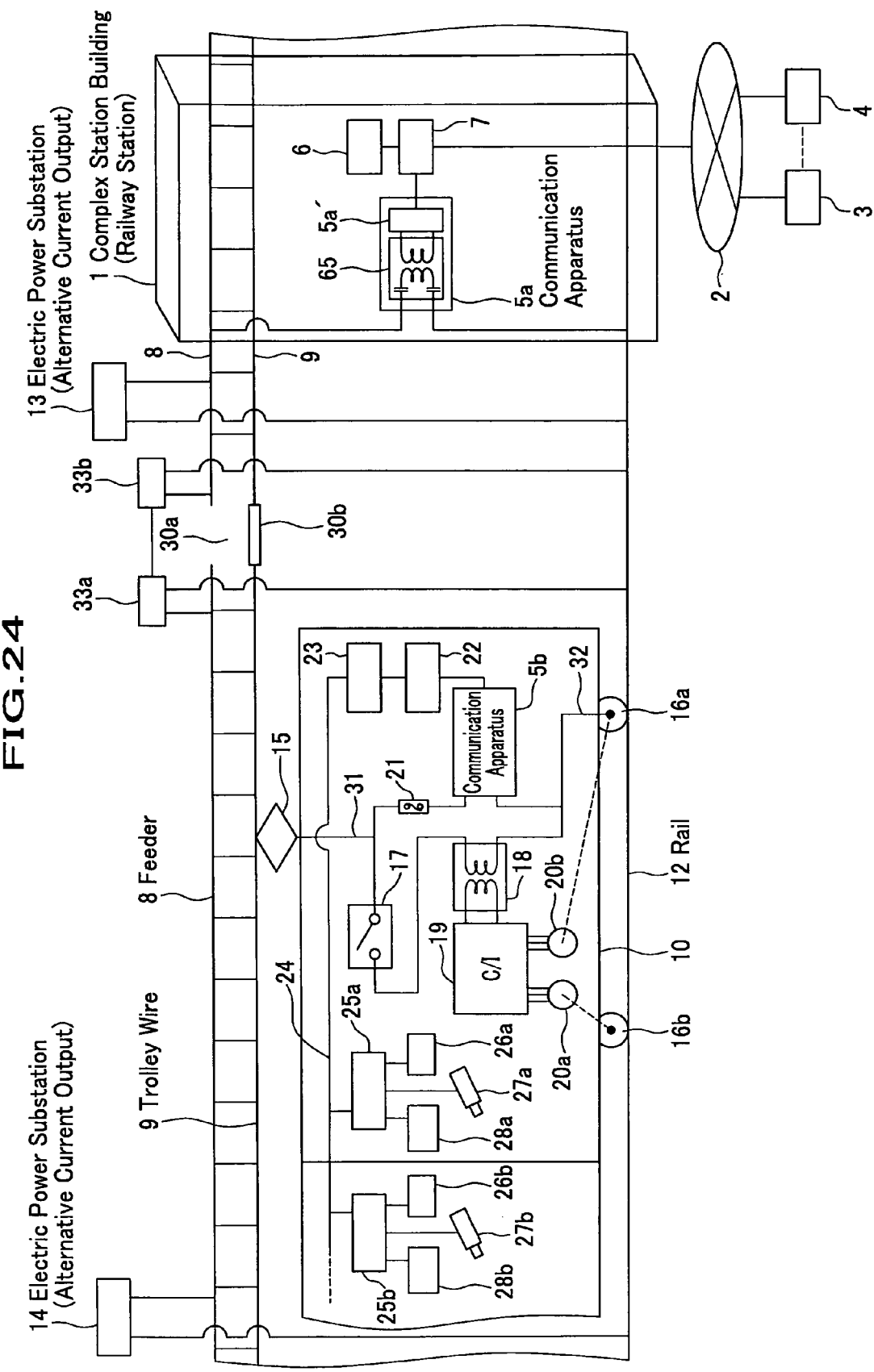
FIG. 24 shows an explanatory schematic for the second embodiment of the present invention.

The second embodiment of the present invention is explained by using FIG. 24, where a protocol conversion device is set between two feeders 8 which are isolated by the electric power substations 14. The portions common to those of FIG. 1 are shown in the same codes and are not explained again. The power supply capacity by an electric power substation 14 is limited by every several tens kilometers. The feeder 8 and trolley wire 9 are isolated from other interval to which an AC power is supplied by another electric power substation 14. The isolation is made by a spatial gap 30a between the feeders 8 and an isolator 30b. Therefore while the pantograph 15 is sliding onto the trolley line 9, the communication apparatus 5b cannot communicate with the communication apparatus 5a. In order to solve this problem, a pair of communication devices 33a and 33b is attached to the two isolated feeders 8 and an insulator 30b is set between the trolley wires 9. However the distance between the communication device 5b and the 5a can be longer than several ten kilometers and communication signal largely decays and there is a risk of frequent communication error. In this embodiment, the communication protocols are converted into new protocols so that the new communication is carried out in another interval of electric power substation 14, by which the S/N is improved and the communication signal is refreshed for each interval. The accumulation of noises by every interval can be avoided and the S/N level can be consistently kept as that of each interval.

The third embodiment of the present invention is shown in FIG. 25, by which the communication apparatus 5b installed in the monorail electric car is explained. Two trolley wires 9a and 9b, to which DC electric power is supplied by electric power substation 13, are set on the surface of the concrete monorail 35. The electric power is supplied by two pantographs 15a and 15b from the trolley wires 9a and 9b. The communication apparatus 5b is connected to the pantographs and communicates with a communication apparatus 5b installed in a ticket control office or a train service office of the complex station building or the maintenance factory. The other portions of the system are same as those shown in FIG. 1. Since two trolley wires 9a and 9b are floating from the ground, the dielectric decay due to the water is suppressed in the communication. The two parallel trolley wires construct parallel communication lines where TEM (Transverse Electro-Magnetic) propagation mode dominates. Therefore the carrier signal tends to travel in such a propagation mode so that results in less decay communication.

The present invention has another feature that the intra communication apparatus is installed in the stations, complex station buildings or station yards and not power substations which are seen for the case of the conventional technology. The feature is that the inverter used for the electric cars stop while the train stops at the track of the station. This provides an advantage that the high-speed data communication is possible during such time since the noises generated by the inverter becomes almost zero. Therefore the large volume of data can be transferred to the train for such a stopping time. For the case of the conventional technology, the intra communication is performed between the train and the power substations. However, the noise level does not decrease when the train comes close to a power substation to which an intra communication apparatus is installed since the train, therefore inverters, is operating. In addition, the time duration when the train is close to the power substation is quite short. Therefore there is scarce time to carry out the high-speed data communication. The dynamic adaptation capabilities to the communication condition regarding the multiple carrier and the OFDM contribute such timely large-data communication as well.

Although there have been disclosed what are the patent embodiment of the invention, it will be understood by person skilled in the art that variations and modifications may be made thereto without departing from the scope of the invention, which is indicated by the appended claims. For example, this communication apparatus can be applied to the railway vehicles that provided services in the industrial areas where the electromagnetic environmental noises heavily exist due to the presence of many types of machinery using inverter systems.

By applying this invention, it is possible to realize a stable and reliable intra communication system between the railway vehicles and the stations or maintenance factories in rather low cost. The present intra system is robust enough against the environmental noises or electromagnetic noises generated by the inverter/converter devices equipped to the electric car even under the train operation service. Therefore the present invention facilitates the communication services for security, maintenance data acquisition and information of advertisement and the train reservation. The application of the present invention to the subways, a preferable effect such as low radio wave interference by the broadcast stations is expected and then the communication error rate can be suppressed in low level and the high-speed communication is obtained between the trains and the stations and other facilities.

What is claimed is:

1. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is physically connected to the railway vehicle and to the communication apparatus installed in the railway facility.

2. A railway vehicle-facility intra communication system, wherein a communication apparatus installed in a railway facility transmits and receives information with a communication apparatus installed in a railway vehicle, characterizing;
to have a capability to communicate to said communication apparatus as a destination device, installed in a railway vehicle, which is connected to a power supply line for supplying electric power to said railway vehicle, through said power line as a communication line,
wherein the power supply line is physically connected to the railway vehicle and to the communication apparatus installed in the railway facility.

3. A railway vehicle-facility intra communication system according to claim 1, wherein
a communication apparatus installed in said railway vehicle, being connected to a power supply line for supplying electric power thereto, transmits and receives information through said power supply line as well as an electric collector and a rail which are connected to said power supply line.

4. A railway vehicle-facility intra communication system according to claim 2, wherein
a communication apparatus installed in said railway facility, being connected to said power supply line for supplying electric power to said railway vehicle, through said rail as well as one electric conductive lines among a feeder, a trolley line and a third rail, transmits and receives information through said rail as well as one electric conductive line among a feeder, a trolley line and a third rail.

5. A railway vehicle-facility intra communication system according to claim 1, wherein
a communication apparatus installed in said railway vehicle, being connected to said power supply line for supplying electric power to said railway vehicle, through a electric collector, transmits and receives information through said electric collector and said power supply line.

6. A railway vehicle-facility intra communication system according to claim 2, wherein
a communication apparatus installed in said railway facility, being connected to said power supply line for supplying electric power to said railway vehicle, through trough two trolley wires, transmits and receives information through said two trolley wires.

7. A railway vehicle-facility intra communication system according to claim 1, wherein
a carrier signal used for said communication apparatuses installed in said railway vehicle and said railway facility is composed of plural sub-carriers to which transmitting data are allocated in response to an S/N value specifically given to one of said plural sub-carriers wherein every said S/N value is determined by one of methods among measurement and estimation of S/N where said S/N is defined as a numerical ratio of signal power to noise power.

8. A railway vehicle-facility intra communication s system according to claim 2, wherein
a carrier signal used for said communication apparatuses installed in said railway vehicle and said railway facility is composed of plural sub-carriers to which transmitting data are allocated in response to an S/N value specifically given to one of said plural sub-carriers wherein every said S/N value is determined by one of methods among measurement and estimation of S/N where said S/N is defined as a numerical ratio of signal power to noise power.

9. A railway vehicle-facility intra communication system according to claim 1, wherein
a carrier signal used for said communication apparatuses installed in said railway vehicle and said railway facility is composed of plural sub-carriers to which transmitting data are allocated in response to a communication error rate specifically given to one of said plural sub-carriers wherein every said communication error rate value is determined by evaluating one of methods among measurement and estimation of S/N where said S/N is defined as a numerical ratio of signal is power to noise power.

10. A railway vehicle-facility intra communication system according to claim 2, wherein
a carrier signal used for said communication apparatuses installed in said railway vehicle and said railway facility is composed of plural sub-carriers to which transmitting data are allocated in response to a communication error rate specifically given to one of said plural sub-carriers wherein every said communication error rate value is determined by evaluating one of methods among measurement and estimation of S/N where said S/N is defined as a numerical ratio of signal power to noise power.

11. A railway vehicle-facility intra communication system according to claim 1, wherein
a communication scheme adopted in said communication apparatuses installed in said railway vehicle and said railway to facility is orthogonal frequency division multiplexing.

12. A railway vehicle-facility intra communication system according to claim 2, wherein
a communication scheme adopted in said communication apparatuses installed in said railway vehicle and said railway facility is orthogonal frequency division multiplexing.

13. A railway vehicle-facility intra communication system according to claim 1, wherein
a carrier signal used for said communication apparatuses installed in said railway vehicle and said railway facility is composed of at least one carrier wherein transmitting data are allocated thereto at a predetermined frequency band and said transmitting data are allocated to a carrier of which frequency is shifted from said predetermined frequency band to another predetermined frequency band in case that S/N value is less than a predetermined value.

14. A railway vehicle-facility intra communication system according to claim 2, wherein
a carrier signal used for said communication apparatuses installed in said railway vehicle and said railway facility is composed of at least one carrier wherein transmitting data are allocated thereto at a predetermined frequency band and said transmitting data are allocated to a carrier of which frequency is shifted from said predetermined frequency band to another predetermined frequency band in case that S/N value is less than a predetermined value.

15. A railway vehicle-facility intra communication system according to claim 1, wherein
a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently in a frequency domain.

16. A railway vehicle-facility intra communication system according to claim 2, wherein
a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently in a frequency domain.

17. A railway vehicle-facility intra communication system according to claim 1, wherein
a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently with a separation more than 100 KHz in a frequency domain.

18. A railway vehicle-facility intra communication system according to claim 2, wherein
a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently with a separation more than 100 KHz in a frequency domain.

19. A railway vehicle-facility intra communication system according to claim 1, wherein
a carrier signal used for said communication apparatuses installed in said railway vehicle and said railway facility is in a frequency range that is higher than 10 MHz and lower than 30 MHz.

20. A railway vehicle-facility intra communication system according to claim 2, wherein
a carrier signal used for said communication apparatuses installed in said railway vehicle and said railway facility is in a frequency range that is higher than 10 MHz and lower than 30 MHz.

21. A railway vehicle-facility intra communication method, wherein communication apparatus installed in a railway vehicle and in a railway facility, which are physically connected to a power supply line for supplying electric power to said railway vehicle, transmits and receives information therebetween through said power supply line as a communication line, characterizing;
to have a capability to handle a graphic information that is displayed on a display device for passenger service.

22. A railway vehicle-facility intra communication method, wherein communication apparatus installed in a railway vehicle and in a railway facility, which are physically connected to a power supply line for supplying electric power to said railway vehicle, transmits and receives information therebetween through said power supply line as a communication line, characterizing;
to have a capability to handle a graphic information that is displayed on a display device for train operator service.

23. A railway vehicle-facility intra communication method, wherein communication apparatus installed in a railway vehicle and in a railway facility, which are connected to a power supply line for supplying electric power to said railway vehicle, transmits and receives information therebetween through said power supply line as a communication line, characterizing;
to have a capability to execute a real-time communication process in transmitting train operation data to be used for maintenance and inspection of said railway vehicle.

24. A railway vehicle-facility intra communication method, wherein communication apparatus installed in a railway vehicle and in a railway facility, which are connected to a power supply line for supplying electric power to said railway vehicle, transmits and receives information therebetween through said power supply line as a communication line, characterizing;
to include a protocol conversion function in said communication line by at least another one set of two communication apparatuses connected to isolated two feeders that form said communication line.

25. An installation method to install a communication apparatus used for railway vehicle-facility intra communication system, wherein said communication apparatus installed in a railway vehicle and in a railway facility, which are connected to a power supply line for supplying electric power to said railway vehicle, transmits and receives information therebetween through said power supply line as a communication line, characterizing;
to install said communication apparatus in one of rooms among a hollow gap between a ceiling and roof of said vehicle, is a hollow gap between the external floor and the interior floor of said vehicle and a hollow gap between the external wall and the interior wall of said vehicle
wherein the power supply line is physically connected to the railway vehicle and to the communication apparatus installed in the railway facility.

26. An installation method according to claim 25, wherein
said communication apparatus installed in a railway vehicle is connected to a wheel through a electric power cable with a length of several meters to several tens meters.

27. A railway vehicle-facility intra communication system, wherein a communication apparatus installed in a railway vehicle transmits and receives information with a communication apparatus installed in a railway facility, characterizing;
to have a capability to communicate to said communication apparatus as a destination device, installed in said railway facility, which is connected to a power supply line for supplying electric power to said railway vehicle, through said power supply line as a communication line,
wherein a communication apparatus installed in said railway vehicle, being connected to a power supply line for supplying electric power thereto, transmits and receives information through said power supply line as well as an electric collector and a rail which are connected to said power supply line.

28. A railway vehicle-facility intra communication system, wherein a communication apparatus installed in a railway facility transmits and receives information with a communication apparatus installed in a railway vehicle, characterizing;
to have a capability to communicate to said communication apparatus as a destination device, installed in a railway vehicle, which is connected to said power supply line for supplying electric power to said railway vehicle, through said power line as a communication line, wherein a communication apparatus installed in said railway facility, being connected to said power supply line for supplying electric power to said railway vehicle, through said rail as well as one electric conductive lines among a feeder, a trolley line and a third rail, transmits and receives information through said rail as well as one electric conductive line among a feeder, a trolley line and a third rail.

29. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein a communication apparatus installed in said railway vehicle, being connected to said power supply line for supplying electric power to said railway vehicle, through a electric collector, transmits and receives information through said electric collector and said power supply line.

30. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein a communication apparatus installed in said railway facility, being connected to said power supply line for supplying electric power to said railway vehicle, through trough two trolley wires, transmits and receives information through said two trolley wires.

31. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein a carrier signal used for said communication apparatuses installed in said railway vehicle and said railway facility is composed of plural sub-carriers to which transmitting data are allocated in response to an S/N value specifically given to one of said plural sub-carriers wherein every said S/N value is determined by one of methods among measurement and estimation of S/N where said S/N is defined as a numerical ratio of signal power to noise power.

32. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein a carrier signal used for said communication apparatuses installed in said railway vehicle and said railway facility is composed of plural sub-carriers to which transmitting data are allocated in response to an S/N value specifically given to one of said plural sub-carriers wherein every said S/N value is determined by one of methods among measurement and estimation of S/N where said S/N is defined as a numerical ratio of signal power to noise power.

33. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein a carrier signal used for said communication apparatuses installed in said railway vehicle and said railway facility is composed of plural sub-carriers to which transmitting data are allocated in response to a communication error rate specifically given to one of said plural sub-carriers wherein every said communication error rate value is determined by evaluating one of methods among measurement and estimation of S/N where said S/N is defined as a numerical ratio of signal is power to noise power.

34. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein a carrier signal used for said communication apparatuses installed in said railway vehicle and said railway facility is composed of plural sub-carriers to which transmitting data are allocated in response to a communication error rate specifically given to one of said plural sub-carriers wherein every said communication error rate value is determined by evaluating one of methods among measurement and estimation of S/N where said S/N is defined as a numerical ratio of signal power to noise power.

35. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein a carrier signal used for said communication apparatuses installed in said railway vehicle and said railway facility is composed of at least one carrier wherein transmitting data are allocated thereto at a predetermined frequency band and said transmitting data are allocated to a carrier of which frequency is shifted from said predetermined frequency band to another predetermined frequency band in case that S/N value is less than a predetermined value.

36. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently in a frequency domain.

37. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently in a frequency domain.

38. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently with a separation more than 100 KHz in a frequency domain.

39. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently with a separation more than 100 KHz in a frequency domain.

40. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is connected to the railway vehicle, and wherein a communication apparatus installed in said railway vehicle, being connected to a power supply line for supplying electric power thereto, transmits and receives information through said power supply line as well as an electric collector and a rail which are connected to said power supply line.

41. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein the power supply line is connected to the railway vehicle, and wherein a communication apparatus installed in said railway facility, being connected to said power supply line for supplying electric power to said railway vehicle, through said rail as well as one electric conductive lines among a feeder, a trolley line and a third rail, transmits and receives information through said rail as well as one electric conductive line among a feeder, a trolley line and a third rail.

42. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is connected to the railway vehicle, and wherein a communication apparatus installed in said railway vehicle, being connected to said power supply line for supplying electric power to said railway vehicle, through a electric collector, transmits and receives information through said electric collector and said power supply line.

43. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein the power supply line is connected to the railway vehicle, and wherein a communication apparatus installed in said railway facility, being connected to said power supply line for supplying electric power to said railway vehicle, through trough two trolley wires, transmits and receives information through said two trolley wires.

44. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is connected to the railway vehicle, and wherein a carrier signal used for said communication apparatuses installed in said railway vehicle and said railway facility is composed of plural sub-carriers to which transmitting data are allocated in response to an S/N value specifically given to one of said plural sub-carriers wherein every said S/N value is determined by one of methods among measurement and estimation of S/N where said S/N is defined as a numerical ratio of signal power to noise power.

45. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein the power supply line is connected to the railway vehicle, and wherein a carrier signal used for said communication apparatuses installed in said railway vehicle and said railway facility is composed of plural sub-carriers to which transmitting data are allocated in response to an S/N value specifically given to one of said plural sub-carriers wherein every said S/N value is determined by one of methods among measurement and estimation of S/N where said S/N is defined as a numerical ratio of signal power to noise power.

46. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is connected to the railway vehicle, and wherein a carrier signal used for said communication apparatuses installed in said railway vehicle and said railway facility is composed of plural sub-carriers to which transmitting data are allocated in response to a communication error rate specifically given to one of said plural sub-carriers wherein every said communication error rate value is determined by evaluating one of methods among measurement and estimation of S/N where said S/N is defined as a numerical ratio of signal is power to noise power.

47. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein the power supply line is connected to the railway vehicle, and wherein a carrier signal used for said communication apparatuses installed in said railway vehicle and said railway facility is composed of plural sub-carriers to which transmitting data are allocated in response to a communication error rate specifically given to one of said plural sub-carriers wherein every said communication error rate value is determined by evaluating one of methods among measurement and estimation of S/N where said S/N is defined as a numerical ratio of signal power to noise power.

48. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is connected to the railway vehicle, and wherein a carrier signal used for said communication apparatuses installed in said railway vehicle and said railway facility is composed of at least one carrier wherein transmitting data are allocated thereto at a predetermined frequency band and said transmitting data are allocated to a carrier of which frequency is shifted from said predetermined frequency band to another predetermined frequency band in case that S/N value is less than a predetermined value.

49. A railway vehicle-facility intra communication system, wherein a communication apparatus installed in a railway facility transmits and receives information with a communication apparatus installed in a railway vehicle, characterizing;
   to have a capability to communicate to said communication apparatus as a destination device, installed in a railway vehicle, which is connected to said power supply line for supplying electric power to said railway vehicle, through said power line as a communication line,
   wherein the power supply line is connected to the railway vehicle, and
   wherein a carrier signal used for said communication apparatuses installed in said railway vehicle and said railway facility is composed of at least one carrier wherein transmitting data are allocated thereto at a predetermined frequency band and said transmitting data are allocated to a carrier of which frequency is shifted from said predetermined frequency band to another predetermined frequency band in case that S/N value is less than a predetermined value.

50. A railway vehicle-facility intra communication system, wherein a communication apparatus installed in a railway vehicle transmits and receives information with a communication apparatus installed in a railway facility, characterizing;
   to have a capability to communicate to said communication apparatus as a destination device, installed in said railway facility, which is connected to a power supply line for supplying electric power to said railway vehicle, through said power supply line as a communication line,
   wherein the power supply line is connected to the railway vehicle, and
   wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently in a frequency domain.

51. A railway vehicle-facility intra communication system, wherein a communication apparatus installed in a railway facility transmits and receives information with a communication apparatus installed in a railway vehicle, characterizing;
   to have a capability to communicate to said communication apparatus as a destination device, installed in a railway vehicle, which is connected to said power supply line for supplying electric power to said railway vehicle, through said power line as a communication line,
   wherein the power supply line is connected to the railway vehicle, and
   wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently in a frequency domain.

52. A railway vehicle-facility intra communication system, wherein a communication apparatus installed in a railway vehicle transmits and receives information with a communication apparatus installed in a railway facility, characterizing;
   to have a capability to communicate to said communication apparatus as a destination device, installed in said railway facility, which is connected to a power supply line for supplying electric power to said railway vehicle, through said power supply line as a communication line,
   wherein the power supply line is connected to the railway vehicle, and
   wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently with a separation more than 100 KHz in a frequency domain.

53. A railway vehicle-facility intra communication system, wherein a communication apparatus installed in a railway facility transmits and receives information with a communication apparatus installed in a railway vehicle, characterizing;
   to have a capability to communicate to said communication apparatus as a destination device, installed in a railway vehicle, which is connected to said power supply line for supplying electric power to said railway vehicle, through said power line as a communication line,
   wherein the power supply line is connected to the railway vehicle, and
   wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently with a separation more than 100 KHz in a frequency domain.

54. A railway vehicle-facility intra communication system, wherein a communication apparatus installed in a railway vehicle transmits and receives information with a communication apparatus installed in a railway facility, characterizing;
   to have a capability to communicate to said communication apparatus as a destination device, installed in said railway facility, which is connected to a power supply line for supplying electric power to said railway vehicle, through said power supply line as a communication line,
   wherein the power supply line is physically connected to the railway vehicle, and
   wherein a communication apparatus installed in said railway vehicle, being connected to a power supply line for supplying electric power thereto, transmits and receives information through said power supply line as well as an electric collector and a rail which are connected to said power supply line.

55. A railway vehicle-facility intra communication system, wherein a communication apparatus installed in a railway facility transmits and receives information with a communication apparatus installed in a railway vehicle, characterizing;
   to have a capability to communicate to said communication apparatus as a destination device, installed in a railway vehicle, which is connected to said power supply line for supplying electric power to said railway vehicle, through said power line as a communication line, wherein the power supply line is physically connected to the railway vehicle, and wherein a communication apparatus installed in said railway facility, being connected to said power supply line for supplying electric power to said railway vehicle, through said rail as well as one electric conductive lines among a feeder, a trolley line and a third rail, transmits and receives information through said rail as well as one electric conductive line among a feeder, a trolley line and a third rail.

56. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is physically connected to the railway vehicle, and wherein a communication apparatus installed in said railway facility, being connected to said power supply line for supplying electric power to said railway vehicle, through a electric collector, transmits and receives information through said electric collector and said power supply line.

57. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein the power supply line is physically connected to the railway vehicle, and wherein a communication apparatus installed in said railway facility, being connected to said power supply line for supplying electric power to said railway vehicle, through trough two trolley wires, transmits and receives information through said two trolley wires.

58. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is physically connected to the railway vehicle, and wherein a carrier signal used for said communication apparatuses installed in said railway vehicle and said railway facility is composed of plural sub-carriers to which transmitting data are allocated in response to an S/N value specifically given to one of said plural sub-carriers wherein every said S/N value is determined by one of methods among measurement and estimation of S/N where said S/N is defined as a numerical ratio of signal power to noise power.

59. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein the power supply line is physically connected to the railway vehicle, and wherein a carrier signal used for said communication apparatuses installed in said railway vehicle and said railway facility is composed of plural sub-carriers to which transmitting data are allocated in response to an S/N value specifically given to one of said plural sub-carriers wherein every said S/N value is determined by one of methods among measurement and estimation of S/N where said S/N is defined as a numerical ratio of signal power to noise power.

60. A railway vehicle-facility intra communication system, wherein a communication apparatus installed in a railway vehicle transmits and receives information with a communication apparatus installed in a railway facility, characterizing;

to have a capability to communicate to said communication apparatus as a destination device, installed in said railway facility, which is connected to a power supply line for supplying electric power to said railway vehicle, through said power supply line as a communication line, wherein the power supply line is physically connected to the railway vehicle, and wherein a carrier signal used for said communication apparatuses installed in said railway vehicle and said railway facility is composed of plural sub-carriers to which transmitting data are allocated in response to a communication error rate specifically given to one of said plural sub-carriers wherein every said communication error rate value is determined by evaluating one of methods among measurement and estimation of S/N where said S/N is defined as a numerical ratio of signal is power to noise power.

61. A railway vehicle-facility intra communication system, wherein a communication apparatus installed in a railway facility transmits and receives information with a communication apparatus installed in a railway vehicle, characterizing;

to have a capability to communicate to said communication apparatus as a destination device, installed in a railway vehicle, which is connected to said power supply line for supplying electric power to said railway vehicle, through said power line as a communication line, wherein the power supply line is physically connected to the railway vehicle, and wherein a carrier signal used for said communication apparatuses installed in said railway vehicle and said railway facility is composed of plural sub-carriers to which transmitting data are allocated in response to a communication error rate specifically given to one of said plural sub-carriers wherein every said communication error rate value is determined by evaluating one of methods among measurement and estimation of S/N where said S/N is defined as a numerical ratio of signal power to noise power.

62. A railway vehicle-facility intra communication system, wherein a communication apparatus installed in a railway facility transmits and receives information with a communication apparatus installed in a railway vehicle, characterizing;
   to have a capability to communicate to said communication apparatus as a destination device, installed in a railway vehicle, which is connected to said power supply line for supplying electric power to said railway vehicle, through said power line as a communication line,
   wherein the power supply line is physically connected to the railway vehicle, and
   wherein a carrier signal used for said communication apparatuses installed in said railway vehicle and said railway facility is composed of at least one carrier wherein transmitting data are allocated thereto at a predetermined frequency band and said transmitting data are allocated to a carrier of which frequency is shifted from said predetermined frequency band to another predetermined frequency band in case that S/N value is less than a predetermined value.

63. A railway vehicle-facility intra communication system, wherein a communication apparatus installed in a railway vehicle transmits and receives information with a communication apparatus installed in a railway facility, characterizing;
   to have a capability to communicate to said communication apparatus as a destination device, installed in said railway facility, which is connected to a power supply line for supplying electric power to said railway vehicle, through said power supply line as a communication line,
   wherein the power supply line is physically connected to the railway vehicle, and
   wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently in a frequency domain.

64. A railway vehicle-facility intra communication system, wherein a communication apparatus installed in a railway facility transmits and receives information with a communication apparatus installed in a railway vehicle, characterizing;
   to have a capability to communicate to said communication apparatus as a destination device, installed in a railway vehicle, which is connected to said power supply line for supplying electric power to said railway vehicle, through said power line as a communication line,
   wherein the power supply line is physically connected to the railway vehicle, and
   wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently in a frequency domain.

65. A railway vehicle-facility intra communication system, wherein a communication apparatus installed in a railway vehicle transmits and receives information with a communication apparatus installed in a railway facility, characterizing;
   to have a capability to communicate to said communication apparatus as a destination device, installed in said railway facility, which is connected to a power supply line for supplying electric power to said railway vehicle, through said power supply line as a communication line,
   wherein the power supply line is physically connected to the railway vehicle, and
   wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently with a separation more than 100 KHz in a frequency domain.

66. A railway vehicle-facility intra communication system, wherein a communication apparatus installed in a railway facility transmits and receives information with a communication apparatus installed in a railway vehicle, characterizing;
   to have a capability to communicate to said communication apparatus as a destination device, installed in a railway vehicle, which is connected to said power supply line for supplying electric power to said railway vehicle, through said power line as a communication line,
   wherein the power supply line is physically connected to the railway vehicle, and
   wherein a carrier signal used for said communication apparatuses installed in said railway vehicle and said railway facility is composed of plural sub-carriers wherein identically same transmitting data are allocated to a group of said plural sub-carriers including at least two sub-carriers, of which group of said plural sub-carriers locates adjacently with a separation more than 100 KHz in a frequency domain.

67. A railway vehicle-facility intra communication system, wherein a communication apparatus installed in a railway facility transmits and receives information with a communication apparatus installed in a railway vehicle, characterizing;
   to have a capability to communicate to said communication apparatus as a destination device, installed in said railway facility, which is connected to a power supply line for supplying electric power to said railway vehicle, through said power supply line as a communication line,
   wherein the power supply line is physically connected to the railway vehicle, and
   wherein a carrier signal used for said communication apparatuses installed in said railway vehicle and said railway facility is composed of at least one carrier wherein transmitting data are allocated thereto at a predetermined frequency band and said transmitting data are allocated to a carrier of which frequency is shifted from said predetermined frequency band to another predetermined frequency band in case that S/N value is less than a predetermined value.

* * * * *